(12) United States Patent
Pepe et al.

(10) Patent No.: US 9,885,841 B2
(45) Date of Patent: Feb. 6, 2018

(54) CONNECTORS AND ADAPTERS WITH AUTO-LATCHING FEATURES

(71) Applicants: Tyco Electronics Corporation, Berwyn, PA (US); ADC Telecommunications, Inc., Berwyn, PA (US)

(72) Inventors: Paul John Pepe, Clemmons, NC (US); Joseph C. Coffey, Burnsville, MN (US)

(73) Assignee: CommScope Technologies LLC, Hickory, NC (US)

( * ) Notice: Subject to any disclaimer, the term of this patent is extended or adjusted under 35 U.S.C. 154(b) by 11 days.

(21) Appl. No.: 14/749,315

(22) Filed: Jun. 24, 2015

(65) Prior Publication Data

US 2015/0346436 A1    Dec. 3, 2015

Related U.S. Application Data

(63) Continuation of application No. 13/937,673, filed on Jul. 9, 2013, now Pat. No. 9,075,205.

(Continued)

(51) Int. Cl.
| | |
|---|---|
| G02B 6/36 | (2006.01) |
| G02B 6/38 | (2006.01) |
| H01R 13/62 | (2006.01) |
| F16B 17/00 | (2006.01) |
| H01R 24/64 | (2011.01) |

(Continued)

(52) U.S. Cl.
CPC ........... G02B 6/3893 (2013.01); F16B 17/00 (2013.01); G02B 6/3825 (2013.01); G02B 6/3895 (2013.01); H01R 13/62 (2013.01);

*H01R 13/6278* (2013.01); *H01R 13/639* (2013.01); *H01R 24/64* (2013.01);
(Continued)

(58) Field of Classification Search
CPC ........................................................ G02B 6/389
See application file for complete search history.

(56) References Cited

U.S. PATENT DOCUMENTS

| | | | | |
|---|---|---|---|---|
| 6,304,436 B1 * | 10/2001 | Branch | ............... | G02B 6/4277 |
| | | | | 361/679.02 |
| 6,375,362 B1 * | 4/2002 | Heiles | ................. | G02B 6/3827 |
| | | | | 385/135 |

(Continued)

FOREIGN PATENT DOCUMENTS

| | | |
|---|---|---|
| JP | 2005084162 A | 3/2005 |
| JP | 2005-115324 | 4/2005 |

(Continued)

OTHER PUBLICATIONS

International Search Report and Written Opinion for PCT/US2013/049928 dated Oct. 22, 2013.

(Continued)

*Primary Examiner* — Sung Pak
*Assistant Examiner* — Hoang Tran
(74) *Attorney, Agent, or Firm* — Merchant & Gould P.C.

(57) ABSTRACT

Fiber optic connectors and adapters may be automatically secured and released via a management system. Such automation may inhibit accidental and/or unauthorized insertion of fiber optic connectors into adapter ports. The automation also may inhibit accidental and/or unauthorized removal of the fiber optic connectors from the adapter ports.

21 Claims, 26 Drawing Sheets

Related U.S. Application Data

(60) Provisional application No. 61/670,412, filed on Jul. 11, 2012, provisional application No. 61/707,274, filed on Sep. 28, 2012.

(51) Int. Cl.
    *H01R 13/639* (2006.01)
    *H01R 13/627* (2006.01)
    *H01R 107/00* (2006.01)

(52) U.S. Cl.
    CPC ....... *H01R 2107/00* (2013.01); *Y10T 403/602* (2015.01); *Y10T 403/7075* (2015.01)

(56) References Cited

U.S. PATENT DOCUMENTS

| | | | |
|---|---|---|---|
| 6,511,231 B2 | 1/2003 | Lampert et al. | |
| 6,966,788 B1 | 11/2005 | Ruhl, Jr. | |
| 7,128,471 B2 | 10/2006 | Wilson | |
| 7,226,217 B1 | 6/2007 | Benton et al. | |
| 7,229,220 B2 | 6/2007 | Zhu et al. | |
| 7,494,363 B1 | 2/2009 | Wu | |
| 7,787,740 B2* | 8/2010 | Kluwe | G02B 6/4477 385/135 |
| 2004/0101250 A1 | 5/2004 | Vergeest | |
| 2004/0151464 A1 | 8/2004 | Marrs | |
| 2008/0116678 A1 | 5/2008 | Kirchner et al. | |
| 2009/0120428 A1* | 5/2009 | Rabinowitz | F24J 2/1047 126/600 |
| 2009/0238520 A1 | 9/2009 | Wouters | |
| 2009/0269943 A1 | 10/2009 | Palli et al. | |
| 2010/0029117 A1 | 2/2010 | Underwood et al. | |
| 2010/0233889 A1 | 9/2010 | Kiani et al. | |
| 2011/0116748 A1* | 5/2011 | Smrha | G02B 6/3825 385/76 |
| 2011/0222819 A1 | 9/2011 | Anderson et al. | |
| 2011/0235979 A1 | 9/2011 | Anderson et al. | |
| 2011/0255829 A1 | 10/2011 | Anderson et al. | |
| 2011/0262077 A1 | 10/2011 | Anderson et al. | |
| 2011/0317976 A1 | 12/2011 | Eckstein et al. | |
| 2012/0071017 A1 | 3/2012 | Gaul et al. | |
| 2012/0148195 A1 | 6/2012 | Umeno | |
| 2012/0155803 A1 | 6/2012 | Benjamin et al. | |
| 2013/0323940 A1 | 12/2013 | Coffey et al. | |

FOREIGN PATENT DOCUMENTS

| | | |
|---|---|---|
| WO | WO 2007/103689 A2 | 9/2007 |
| WO | WO 2009/006400 A1 | 1/2009 |

OTHER PUBLICATIONS

International Search Report and Written Opinion for PCT/US2013/041612 dated Aug. 27, 2013.

Extended European Search Report received for European Patent Application No. 13816261.5, dated Feb. 2, 2016, 8 Pages.

* cited by examiner

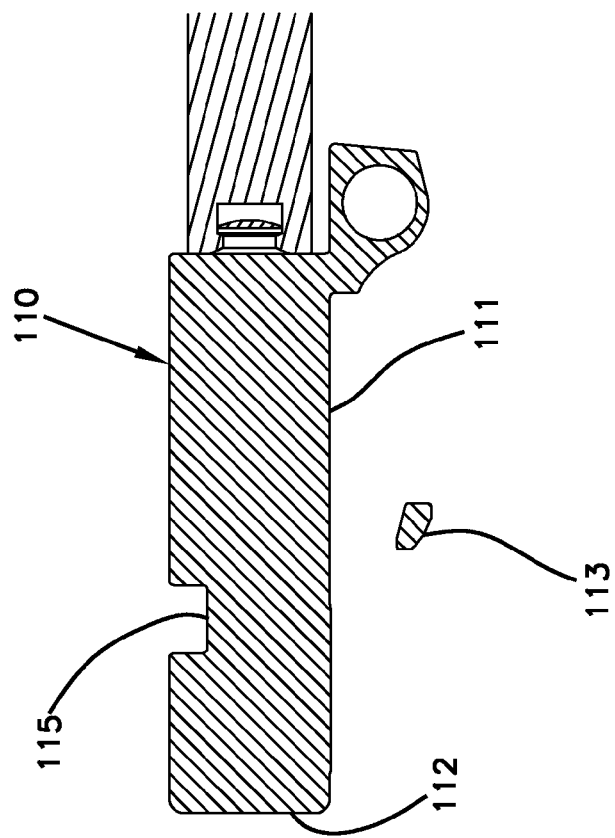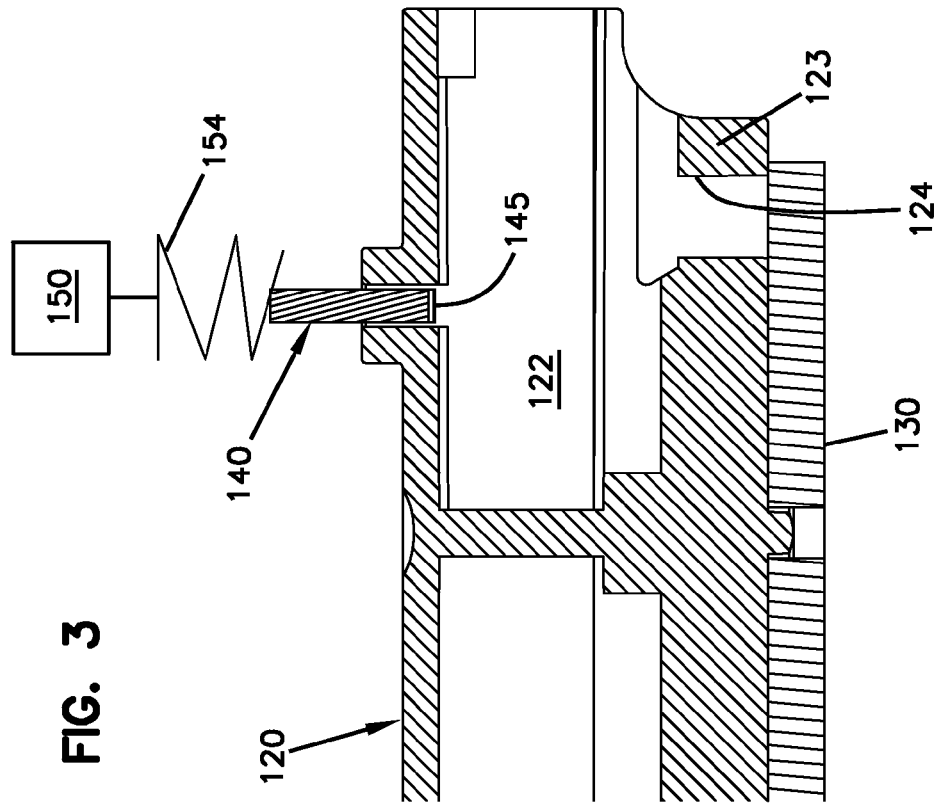
FIG. 3

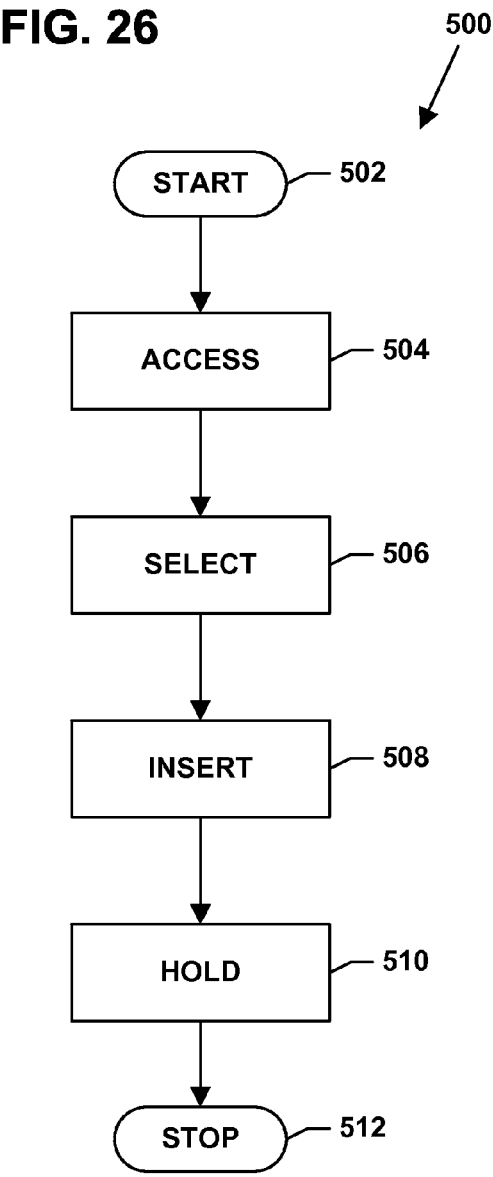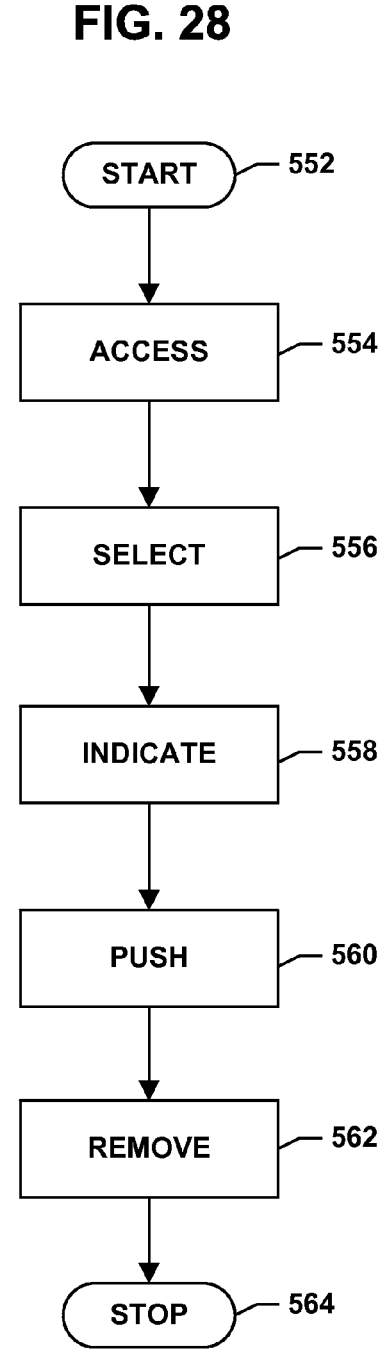

CONNECTORS AND ADAPTERS WITH AUTO-LATCHING FEATURES

CROSS-REFERENCE TO RELATED APPLICATIONS

This application is a continuation of application Ser. No. 13/937,673, filed Jul. 9, 2013, now U.S. Pat. No. 9,075,205, which application claims the benefit of provisional application Ser. No. 61/670,412, filed Jul. 11, 2012 and provisional application Ser. No. 61/707,274, filed Sep. 28, 2012, which applications are incorporated herein by reference in their entirety.

BACKGROUND

In communications infrastructure installations, a variety of communications devices can be used for switching, cross-connecting, and interconnecting communications signal transmission paths in a communications network. Some such communications devices are installed in one or more equipment racks to permit organized, high-density installations to be achieved in limited space available for equipment. Some connections are made between plug connectors (e.g., optical plug connectors, electrical plug connectors, etc.) and adapters (e.g., optical adapters, electrical jacks, etc.) within the communications network.

Manually actuated latch fingers can be actuated accidentally by a user (e.g., when routing cables past a dense group of ports; when actuating an adjacent latch finger; etc.). Improvements in connection of fiber optic connectors are desired.

SUMMARY

Aspects of the present disclosure relate to a plug-type connector including a plug body defining a notch arrangement; and a latching arm pivotally or flexibly coupled to the plug body to move between a deflected position and an undeflected position. In certain implementations, the notch arrangement includes a single notch extending laterally across one side of the plug body. In certain implementations, the notch arrangement includes a notch extending through less than a full width of one side of the plug body. In certain implementations, the notch arrangement includes at least one corner notch.

Other aspects of the present disclosure relate to a coupler assembly for receiving at least one plug-type connector including a coupler body defining at least a first port. A first stop member is disposed at least partially within the coupler body. The first stop member is configured to move relative to the coupler body between a locked position and an unlocked position. The coupler body also may include an abutment surface at which a latch of a plug-type connector may be engaged when the connector is received at the first port.

In certain implementations, the first stop member is spring-biased towards the locked position. In certain implementations, an actuator (e.g., a micro-actuator) operatively couples to the first stop member to control movement of the first stop member between the locked and unlocked positions. In certain implementations, the actuator selectively retains the first stop member against a spring-bias.

In certain implementations, the first stop member is raised and lowered between the unlocked and locked positions. In certain implementations, the first stop member is pivoted between the unlocked and locked positions.

Other aspects of the present disclosure relate to a connector system including a plug-type connector; and a coupler assembly. The plug-type connector includes a plug body defining a notch arrangement and a latch arm coupled to the plug body. The latch arm includes a latch lug that is moveable between undeflected and deflected positions. The coupler assembly defines at least one port and includes a first stop member at the port. An abutment surface of the coupler assembly is configured to engage with the latch lug of the latch arm when the plug-type connector is received at the port of the coupler assembly. The first stop member is configured to move between an unlocked position and a locked position. The first stop member allows the plug-type connector to be removed from the port when the first stop member is disposed in the unlocked position. The first stop member inhibits the plug-type connector from being removed from the port when the first stop member is disposed in the locked position.

Certain types of plug-type connectors terminate optical fibers. Certain types of plug-type connectors terminate conductive wires.

A variety of additional inventive aspects will be set forth in the description that follows. The inventive aspects can relate to individual features and combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 3 is an axial cross-sectional view of a coupler assembly including a spring-biased stop member disposed in the unlocked position;

FIG. 26 is a flowchart illustrating an insertion process by which a user may securely plug a connector into an optical adapter;

FIG. 28 is a flowchart illustrating a removal process by which a user may remove a connector from an optical adapter.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

In general, the present disclosure relates to plug connectors and adapters that may be automatically secured and released via a management system. Such automation may inhibit accidental and/or unauthorized insertion of plug connectors into adapter ports. The automation also may inhibit accidental and/or unauthorized removal of the plug connectors from the ports.

In some implementations, the plug connectors are optical plug connectors (e.g., LC-type connectors, MPO-type connectors, SC-type connectors, LX.5-type connectors, etc.). In other implementations, the plug connectors are electrical plug connectors (e.g., RJ45-type plugs, RJpoint5-type plugs, etc.). For convenience, the remainder of this disclosure will discuss these concepts of this disclosure in terms of LC-type plug connectors and optical adapters. It will be understood by one skilled in the art that the concepts disclosed herein may be applied to other types of plug connectors (e.g., MPO-type connectors, RJ45-type connectors, etc.) without deviating from the scope of the disclosure.

Figure 1:
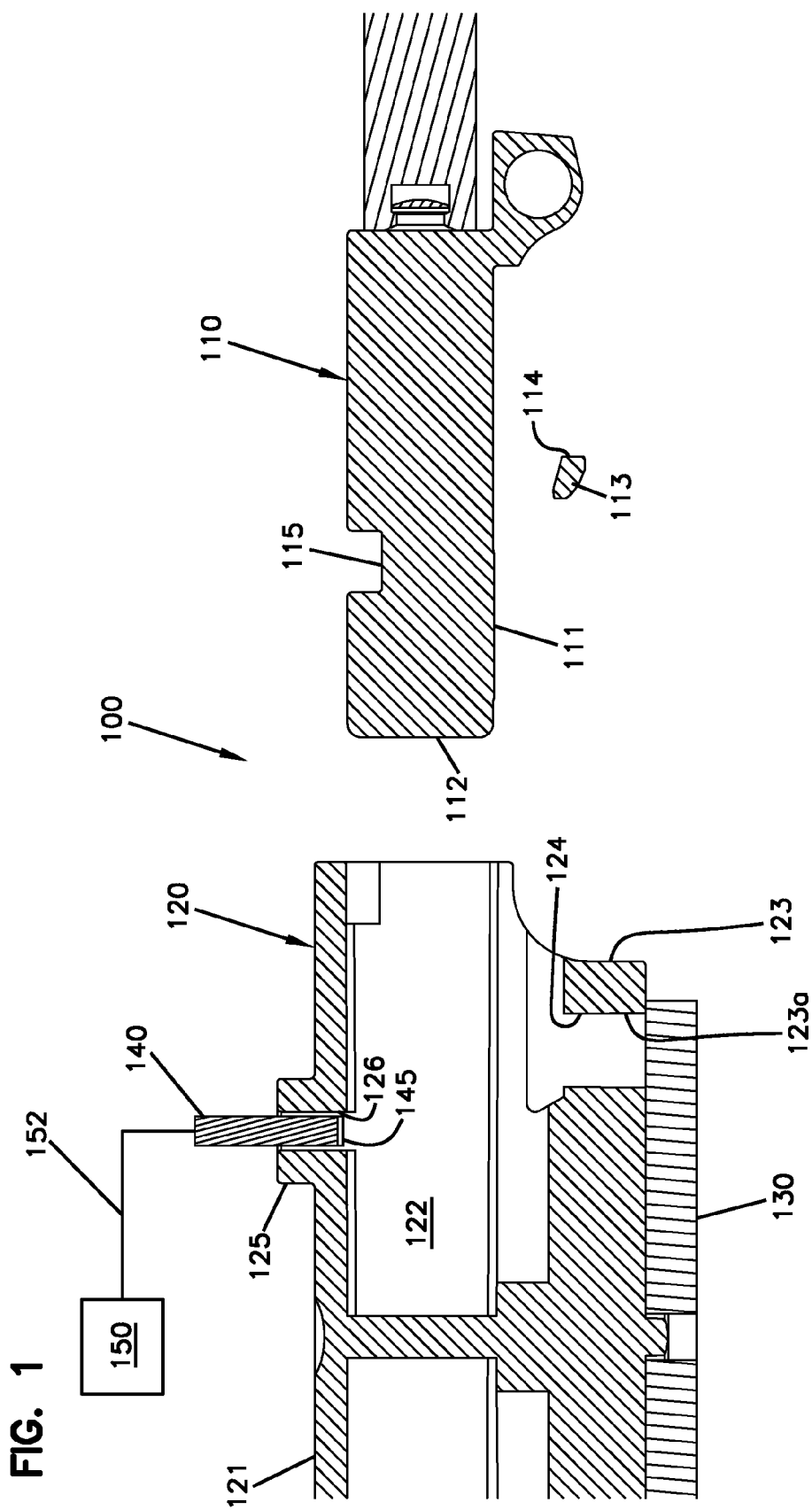
FIG. 1 is an axial cross-sectional view of a plug-type connector being inserted into a port or socket of a coupler assembly, which has a stop member disposed in an unlocked position.
Figure 2:
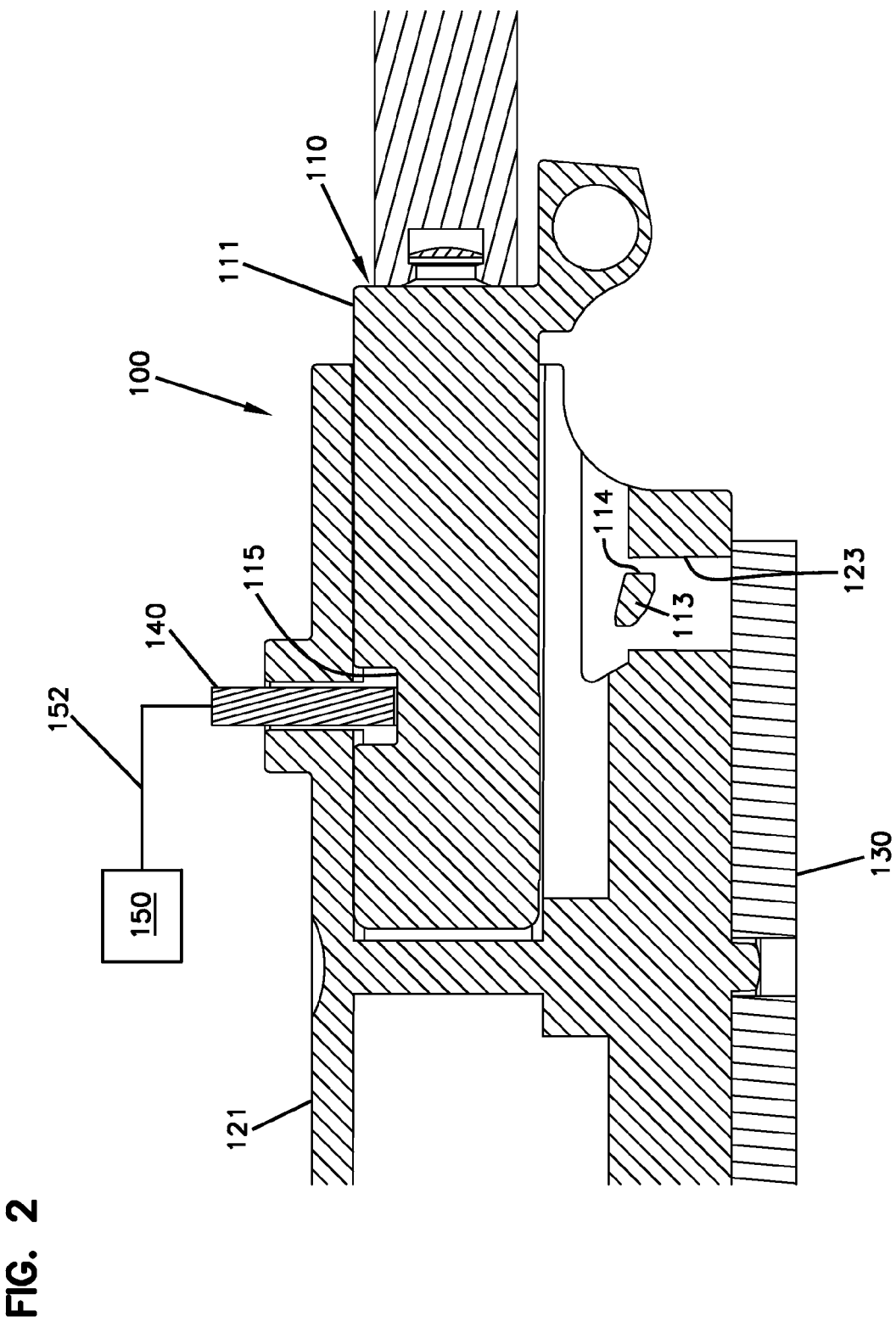
FIG. 2 is an axial cross-sectional view of the plug-type connector of FIG. 1 locked in the coupler assembly port by the stop member.

FIGS. 1 and 2 are schematic diagrams showing a connector system 100 including at least one plug-type connector plug 110 configured to be secured in a port 122 or socket of a connector assembly (e.g., optical adapter, electrical jack, etc.) 120. In some implementations, the plug-type connector 110 includes an optical connector that terminates one or more optical fibers. In other implementations, the plug-type connector 110 may include an electrical plug that terminates one or more conductive wires. Signals from the terminated fibers or wires are accessible towards a front end 112 of the plug-type connector 110.

The connector 110 includes a connector body 111 and a pivoting or flexible latching member that moves between an undeflected position and a deflected position. The latching member includes latching lugs 113 that define abutment surfaces 114. In certain implementations, the latching lugs 113 also define a contoured (e.g., curved or ramped) surface that faces towards the front end 112 of the plug 110. In FIGS. 1 and 2, one of the latching lugs 113 of the latching member is visible. It will be understood that lug 113 in FIGS. 1 and 2 is formed on a latching member that connects to the connector body 111.

The connector assembly 120 includes an end section 123 defining a recess 123. One side of the end section 123 defines an abutment surface 123a within the recess 124. The abutment surface 123a faces towards an interior of the connector assembly 120.

The latching member (and hence the latching lug 113) are biased towards the undeflected position. Accordingly, the latching member is disposed in the undeflected position when external of the coupler 120 (see FIG. 1). As the plug 110 is inserted into the coupler 120, the contoured surface of the latching lug 113 cams over the end section 123 to move the latching member to the deflected position. When the plug 110 is fully inserted, the latching lug 113 clears the end section 123 and drops into the recess 124 when the latching member moves back to the undeflected position. The abutment surface 114 of the latching lug 113 faces and engages the abutment surface 123a of the coupler 120 to retain the plug 110 in the coupler 120 (see FIG. 2). To remove the plug 110 from the coupler 120, the latching member is flexed towards the deflected position until the abutment surface 114 clears the abutment surface 123a of the coupler 120.

In accordance with some aspects of the disclosure, the coupler assembly 120 includes a stop member 140 that is configured to selectively engage and disengage with the plug-type connector 110 by moving between an unlocked position and a locked position. When the stop member 140 is disposed in the unlocked position, the plug 110 can be removed from the coupler 120. When the stop member 140 is disposed in the locked position, the plug 110 cannot be removed from the coupler 120. In certain implementations, the plug 110 cannot be inserted into the coupler 120 when the stop member 140 is disposed in the locked position. In other implementations, insertion of the plug 110 moves the stop member 140 to the unlocked position.

In the example shown in FIGS. 1 and 2, the stop member 140 is configured to move relative to the coupler 120 between a raised (i.e., unlocked) position and a lowered (i.e., locked) position. The coupler 120 includes a support section 125 defining a passage 126 in which the stop member 140 may be disposed. When the stop member 140 is in the locked position, the engagement end 145 of the stop member 140 is disposed within the port 122. In some implementations, an engagement end 145 of the stop member 140 is disposed within the passage 126 when the stop member 140 is in the unlocked position. In other implementations, an engagement end 145 of the stop member 140 is disposed partially within the port 122 when the stop member 140 is in the unlocked position, but not as far into the port 122 as when the stop member 140 is in the locked position.

Figure 6:
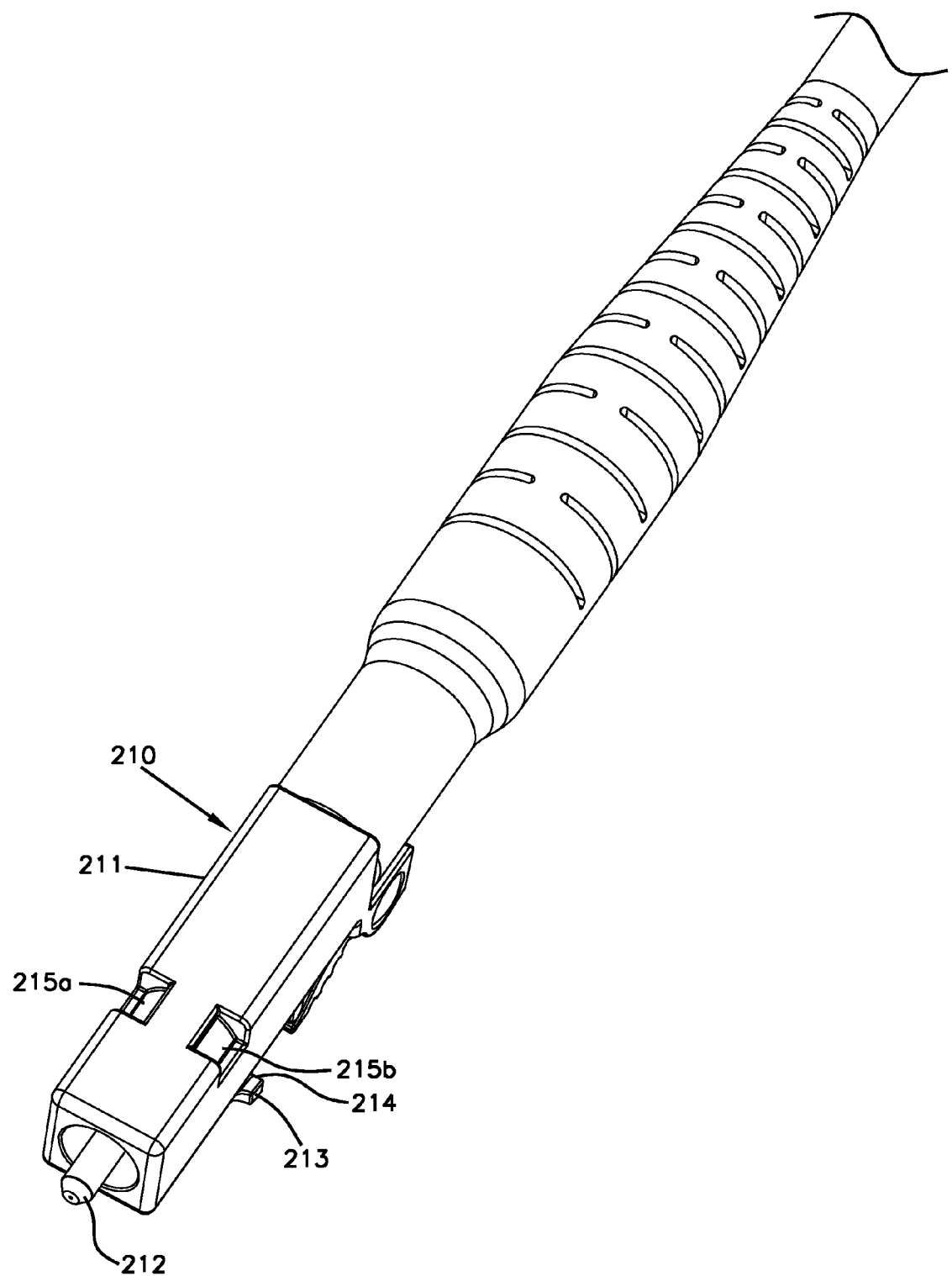
FIG. 6 is a perspective view of the optical connector of FIG. 5 in which the notch arrangement is visible.
Figure 7:
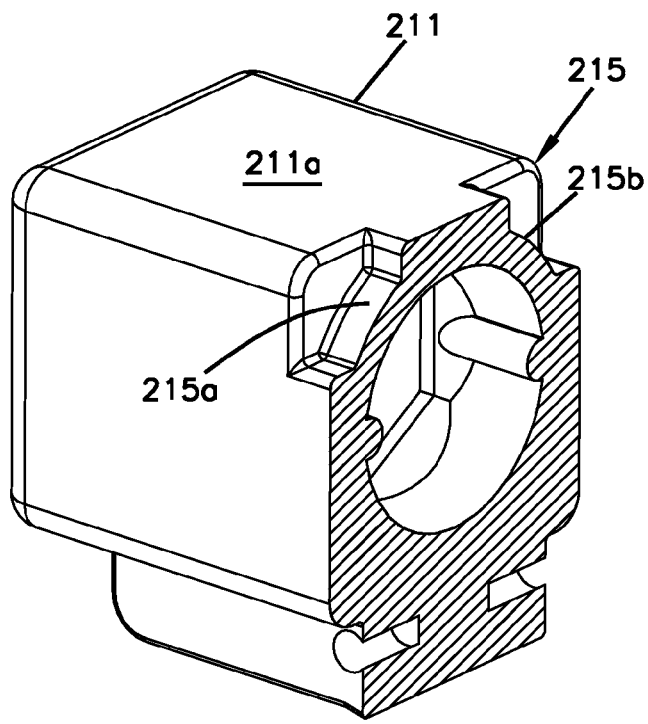
FIG. 7 is a lateral cross-sectional view of the connector of FIG. 5 in which the cross-section is taken through the notch arrangement.

The body 111 of the plug-type connector 110 defines at least one notch 115 sized to receive the lock member 140. In some implementations, the notch 115 is disposed at an opposite side of the plug 110 from the latching member. In other implementations, the notch 115 can be disposed at any desired side of the plug 110. In some implementations, a single notch 115 extends across at least a portion of one side of the plug body 111. In certain implementations, a single notch 115 extends completely across one side of the plug 110. In other implementations, the plug body 111 defines multiple notches 115. For example, one implementation of a plug body 111 may define notches at corners on opposite ends of one side of the plug 110 (see FIG. 6). In other implementations, a notch 115 may be defined at one corner or at only one end of one side of the plug 110. In other implementations, other notch patterns are viable.

As shown in FIG. 2, the plug 110 is releasably locked to the coupler 120 by lowering the stop member 140 into the notch or notches 115 defined in the plug body 111. The lock member 140 inhibits removal of the plug 110 while at least a portion of the stop member 140 is disposed in the notch or notches 115. The plug 110 is released by raising the stop member 140 out of the notch or notches 115.

In some implementations, the lock member 140 is operationally coupled to (see connection 152 in FIGS. 1 and 2) and controlled by an actuator 150. In some implementations, the actuator 150 is a mechanical actuator that pulls and/or pushes the stop member 140 relative to the coupler 120. In other implementations, the actuator 150 otherwise controls (e.g., electrically, magnetically, etc.) movement of the stop member 140 between the locked and unlocked positions.

In some implementations, the actuator 150 will retain the stop feature 140 in the unlocked position before a plug 110 is inserted into the respective port 122. Accordingly, a user is free to attempt insertion of the plug 110 when desired. In other implementations, however, the actuator 150 will retain the stop feature 140 in the locked position when the adapter port 122 is empty. In such implementations, the stop member 140 inhibits insertion of a plug 110 until the actuator 150 releases the stop member 140.

Figure 4:
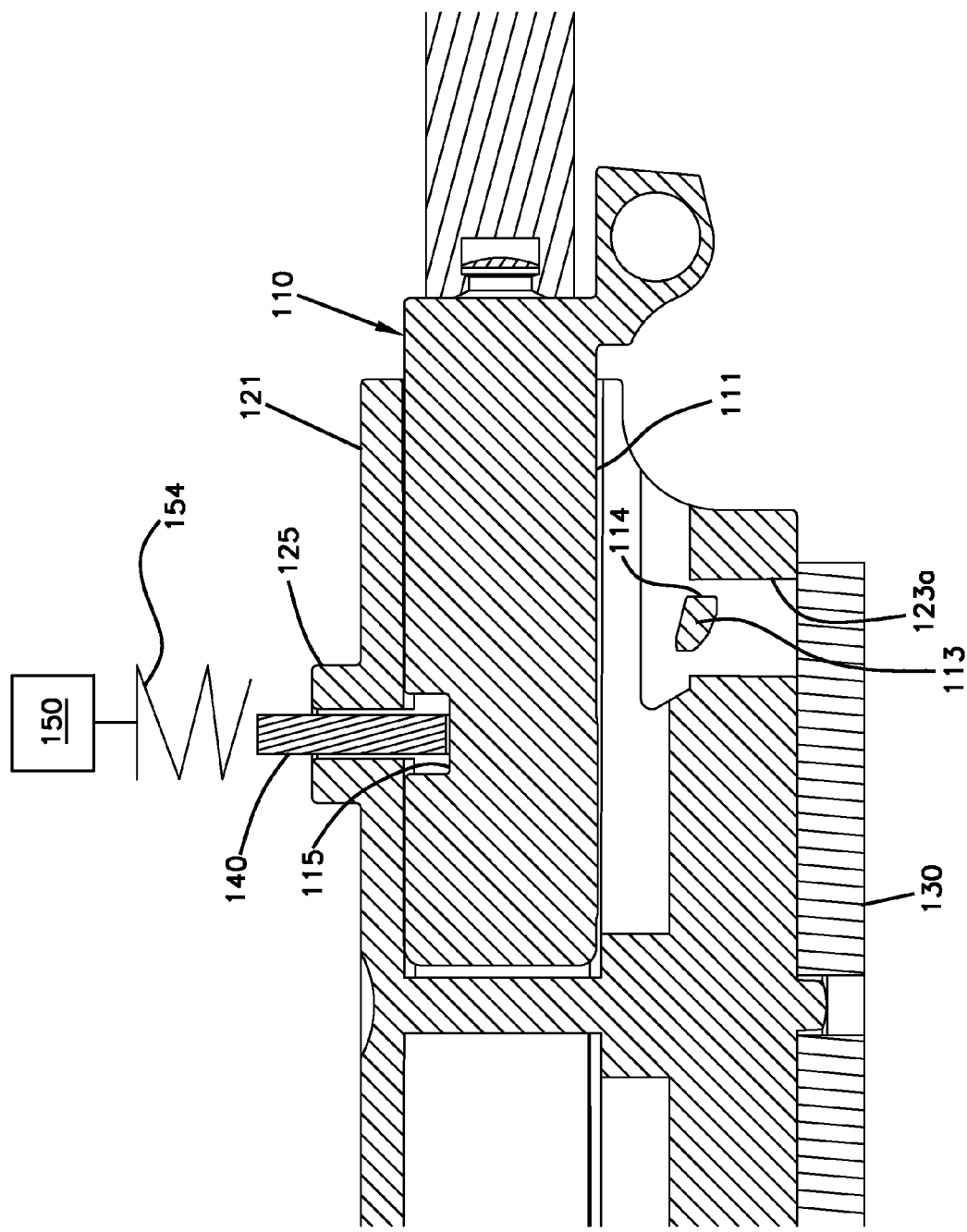
FIG. 4 is an axial cross-sectional view of the coupler assembly of FIG. 3 in which the stop member is locking the plug-type connector.
Figure 5:
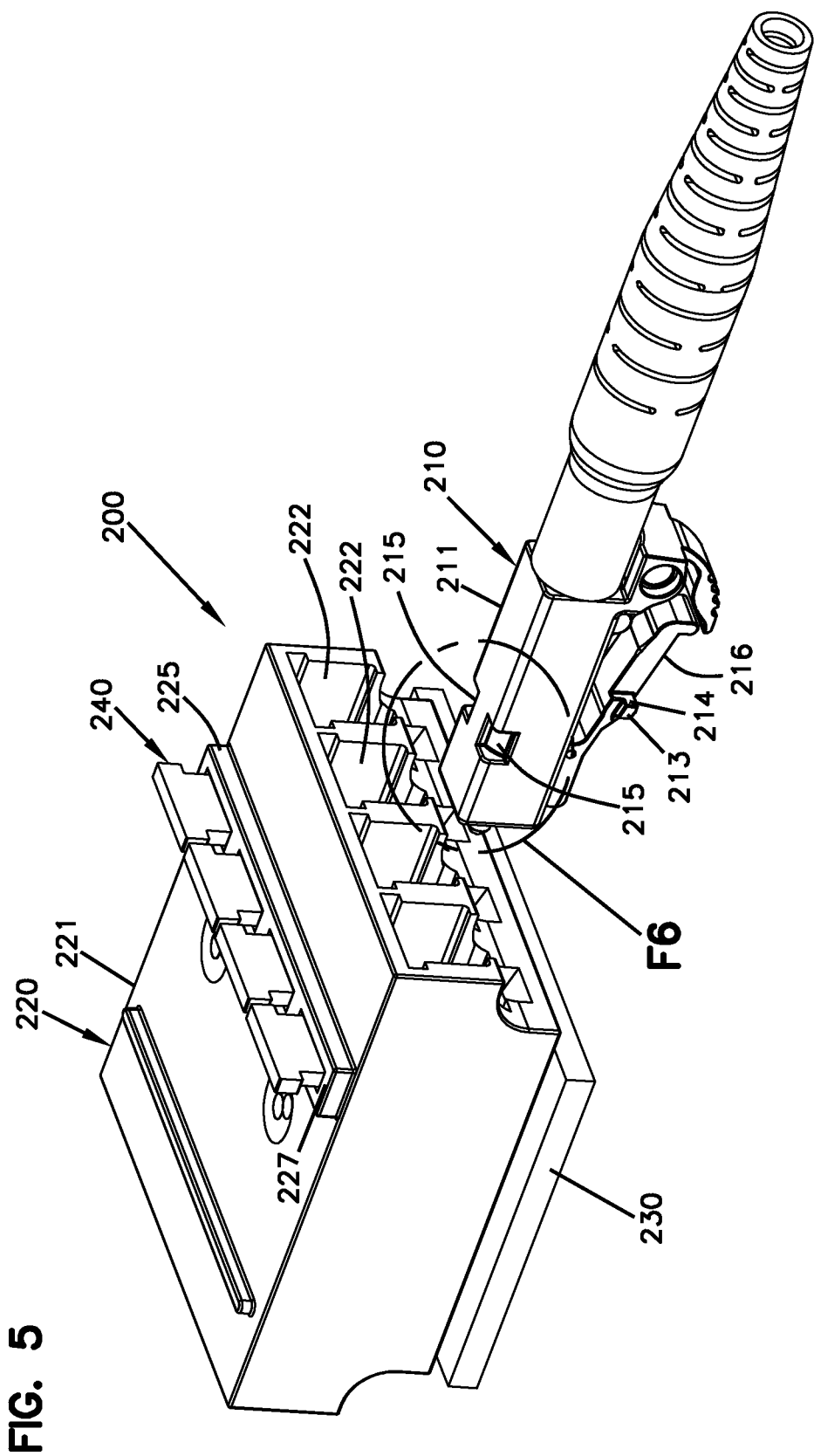
FIG. 5 is a front perspective view of an example implementation of a connector system including an optical connector being inserted into an optical adapter having movable stop members.
Figure 5A:
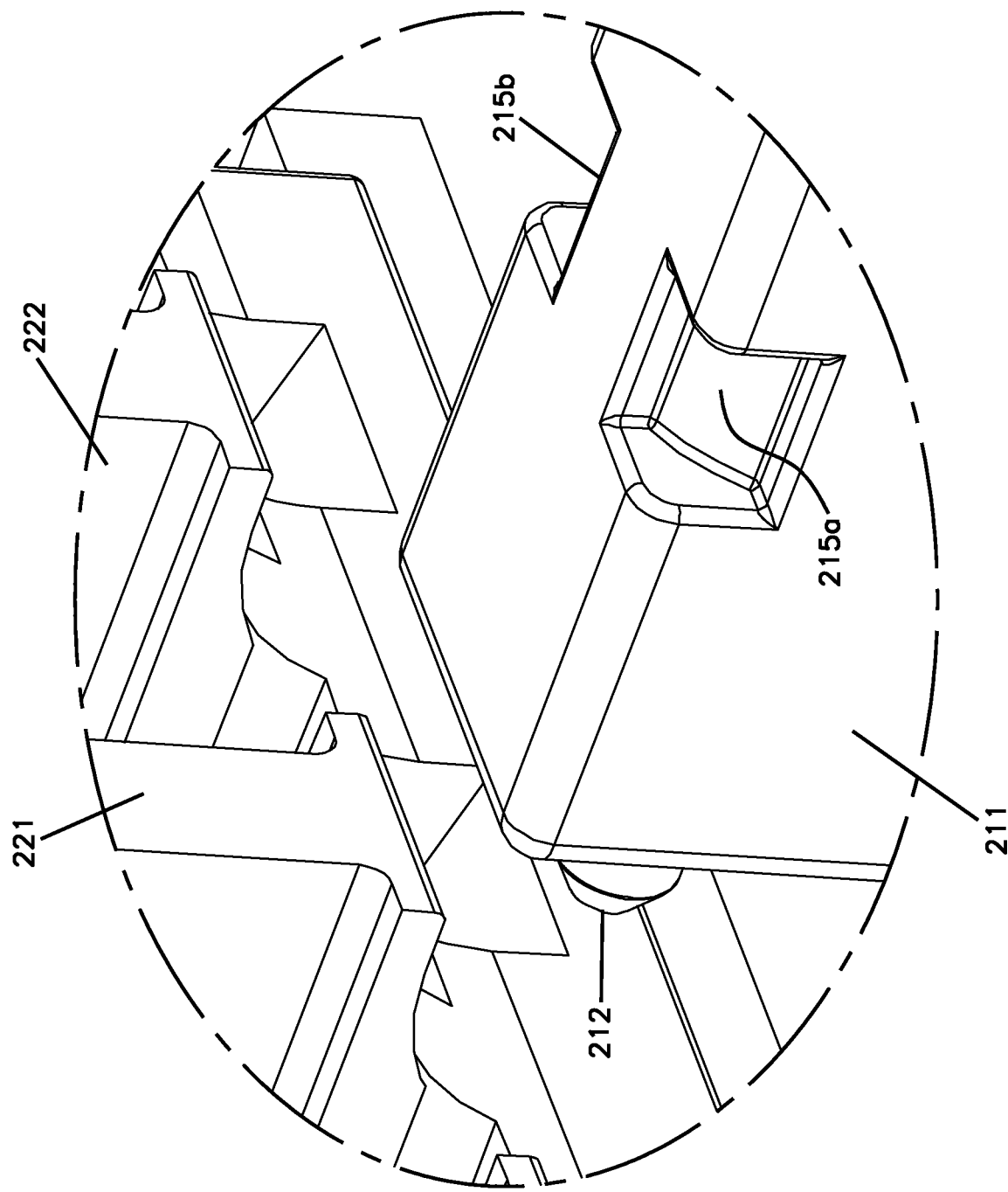
FIG. 5A is an enlarged view of a section of FIG. 5.

FIGS. 3 and 4 illustrate one example implementation of the coupler 120 having a spring-biased stop member 140. A coil spring 154 or other resilient member is coupled to the stop member 140 to bias the engagement end 145 of the stop member 140 into the port 122. In some implementations, the spring 154 is controlled (e.g., selectively retained and released) by the actuator 150. For example, the actuator 150 may retainer the stop member 140 in the unlocked position (FIG. 3) against the bias of the spring 154 and selectively release the spring 154 to allow the spring 154 to move the stop member 140 to the locked position (FIG. 4).

In other implementations, the spring 154 constantly biases the stop member 140 towards the locked position. For example, the stop member 140, the front end 112 of the plug body 111, or both may define a contoured (e.g., curved or ramped) surface that would enable the stop feature 140 to cam over the plug body 111 against the bias of the spring 154 during insertion of the plug 110 into the coupler port 122. In such implementations, the spring 154 would push the stop member 140 into the notch 115 of the plug 110 when the plug 110 was sufficiently inserted to align the stop feature 140 with the notch 115.

In some implementations, a printed circuit board 130 is mounted to the coupler assembly 120 to perform presence detection. Insertion of the plug 110 into the adapter port 122 may be detected by a processor coupled to the circuit board 130. For example, insertion of the plug 110 may complete an electrical circuit at the circuit board 130. In other implementations, insertion of the plug 110 may stop short-circuiting an electrical connection at the board 130. In still other implementations, insertion of the plug 110 may actuate a pressure sensor or other sensing device mounted to the board 130. In certain implementations, the actuator 150 is coupled to the sensing device or processor via the board 130 so that the detection of the plug 110 within the port 122 triggers the actuator 150.

In some implementations, the plug 110 is configured to store information (e.g., physical layer information) and the coupler assembly 120 is configured to read information from the plug 110 when the plug 110 is inserted into the connector port 122. For example, the plug 110 may include an EEPROM, an RFID tag, or other memory storage device. In certain implementations, the printed circuit board 130 couples an information reader at the coupler assembly 120 to a data management system. In some implementations, the reader includes electrical contacts that physically touch electrical contacts on the plug 110. In other implementations, the reader includes an antenna coil and transceiver to read the RFID tag on the plug 110.

FIGS. 5-12 illustrate one example implementation of a connector system 200 including at least one optical connector 210 configured to be secured in a port 222 of an optical adapter 220. The optical adapter 220 includes an adapter body 221 defining at least one port 222. In the example shown, the adapter body 221 defines four ports 222 at a front side and four ports 222 at a rear side. In other implementations, however, the adapter body 221 may define two ports, three ports, eight ports, twelve ports, or any desired number of ports 222.

The optical connector 210 includes a connector body 211 holding a ferrule 212 at which an optical fiber is terminated. A latch arm 216 extends from the connector body 211 and defines lug 213 having abutment surfaces 214 as described above. The optical connector 210 also includes a notch arrangement 215. In the example shown, the notch arrangement 215 includes a first corner notch 215a and a second corner notch 215b that are located at opposite ends of one side 211a of the connector 210 (see FIG. 6). In other implementations, the notch arrangement 215 may include a greater or lesser number of notches 215 defined in any desired surface of the connector 210.

At least one stop member 240 is moveable coupled to the optical adapter 220 to selectively lock the connector 210 within an adapter port 222. In some implementations, the adapter 220 includes a stop member 240 for each port 222. In other implementations, the adapter 220 includes a stop member 240 for each port 222 at only one side (e.g., the front or the rear) of the adapter 220. In the example shown, the adapter 220 includes four stop members 240 that are associated with the front ports 222 of the adapter 220. A support region 225 defines one or more passages 226 (FIG. 9) in which the stop members 240 may be disposed. In some implementations, each stop member 240 is disposed in its own passage 226. The top of the support region 225 forms a support wall 227.

Figure 8:
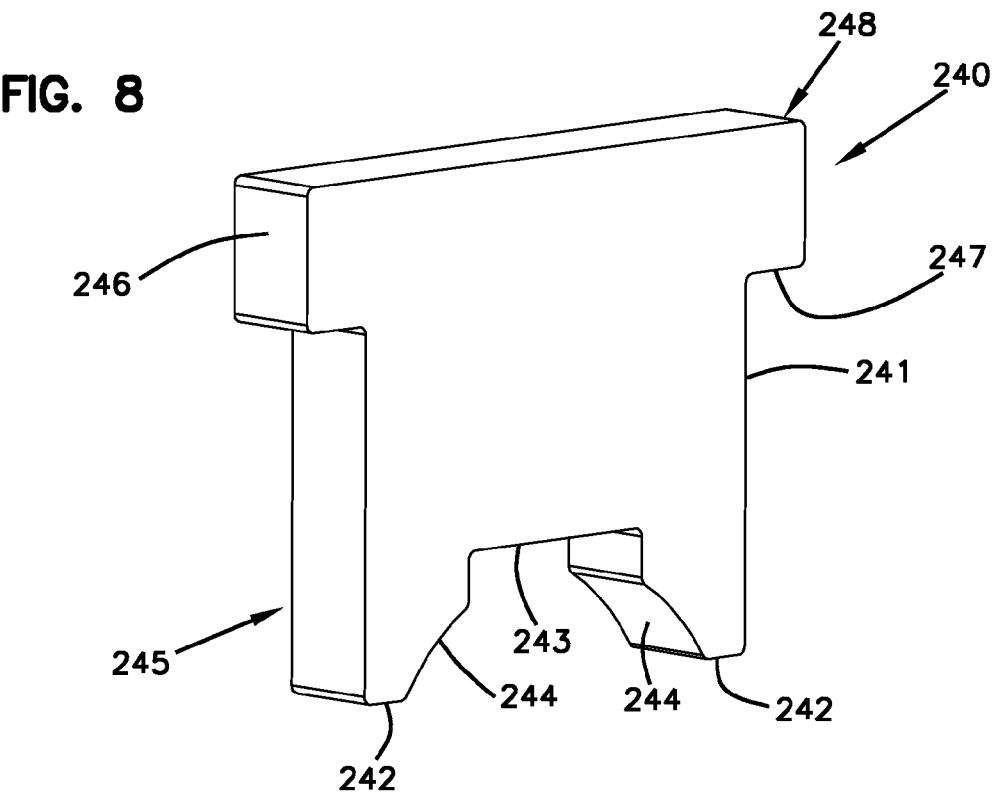
FIG. 8 is a perspective view of an example implementation of a stop member suitable for use in the coupler assemblies disclosed herein.

As shown in FIG. 8, each stop member 240 includes a stop body 241 having an engagement end 245 and an actuation end 248. The actuation end 248 includes arms 246 extend laterally outwardly from the stop body 241. The arms 248 inhibit the stop member 240 from passing completely through the passage 226. For example, each arm 248 defines an abutment surface 247 that seats on the support wall 227 when the stop member 240 is disposed in the locked position (see FIG. 12).

The engagement end 245 of the stop member 240 is sized and shaped to extend into the notch arrangement 215 of the plug 210. In the example shown, the engagement end 245 of the stop member 240 includes two legs 242 that extend downwardly from a plug-facing surface 243. In some implementations, the plug-facing surface 243 seats on the first side 211a of the plug body 211 when the plug 210 is locked. In other implementations, the plug-facing surface 243 is spaced from the plug body 211 even when the legs 242 extend into the plug notches 215. In certain implementations, contours 244 are cut into inner sides of the legs 242 to match the contours of the corner notches 215a, 215b (see FIGS. 7 and 8).

Figure 9:
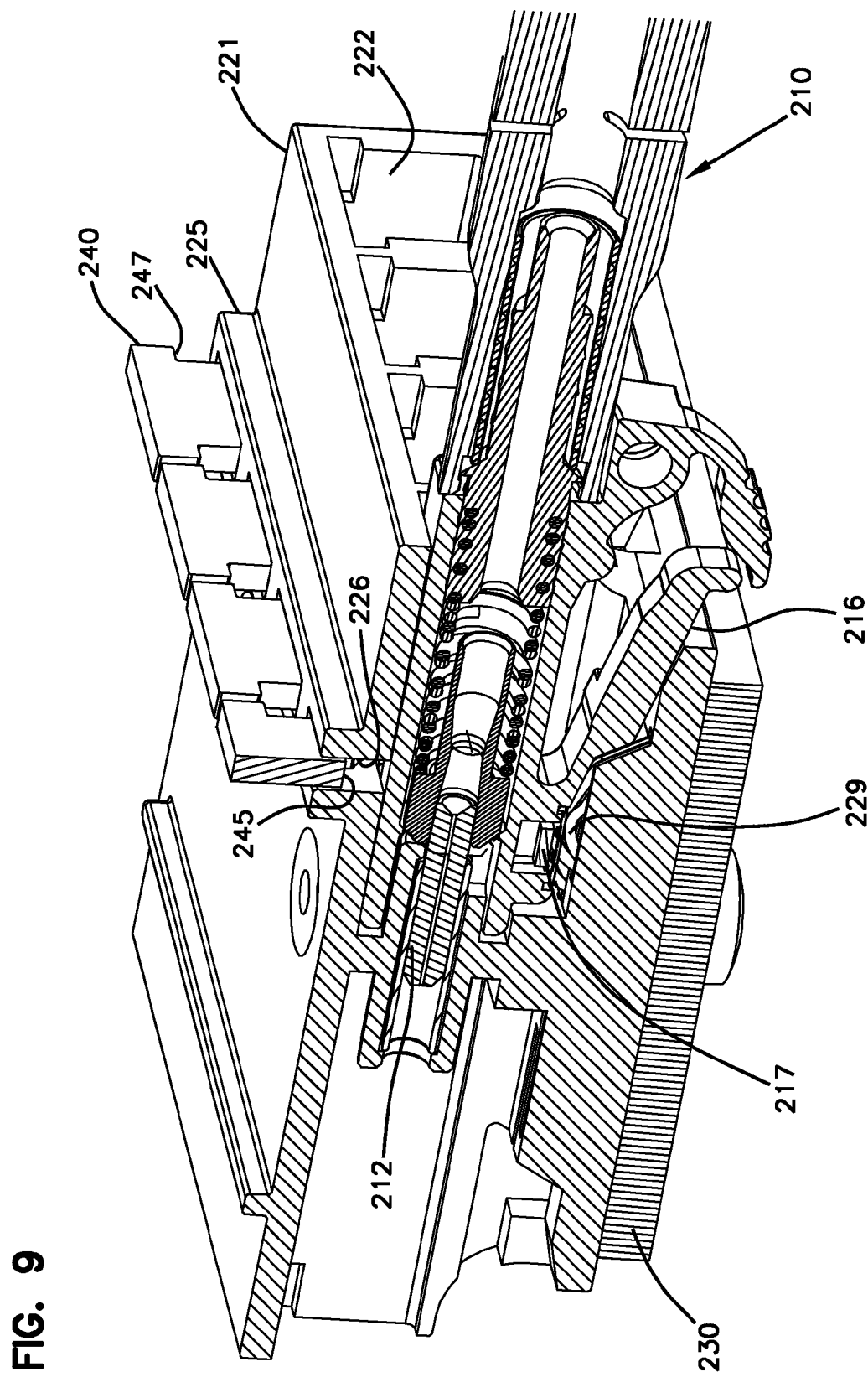
FIG. 9 is an axial cross-sectional view of the optical adapter of FIG. 5 with the optical connector plugged into one of the ports and the stop members in the unlocked position.
Figure 10:
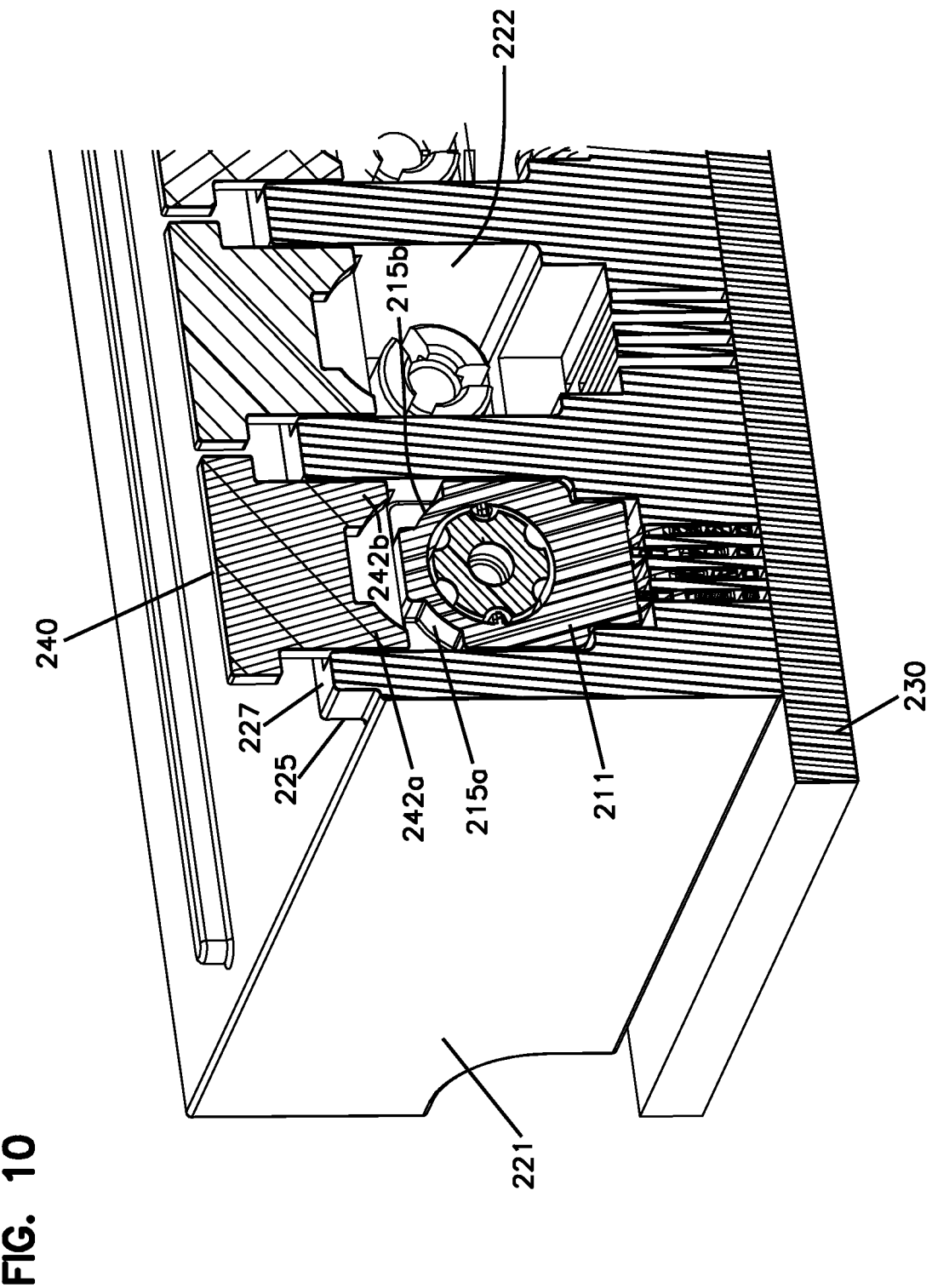
FIG. 10 is a lateral cross-sectional view of the optical adapter and optical connector of FIG. 9.
Figure 11:
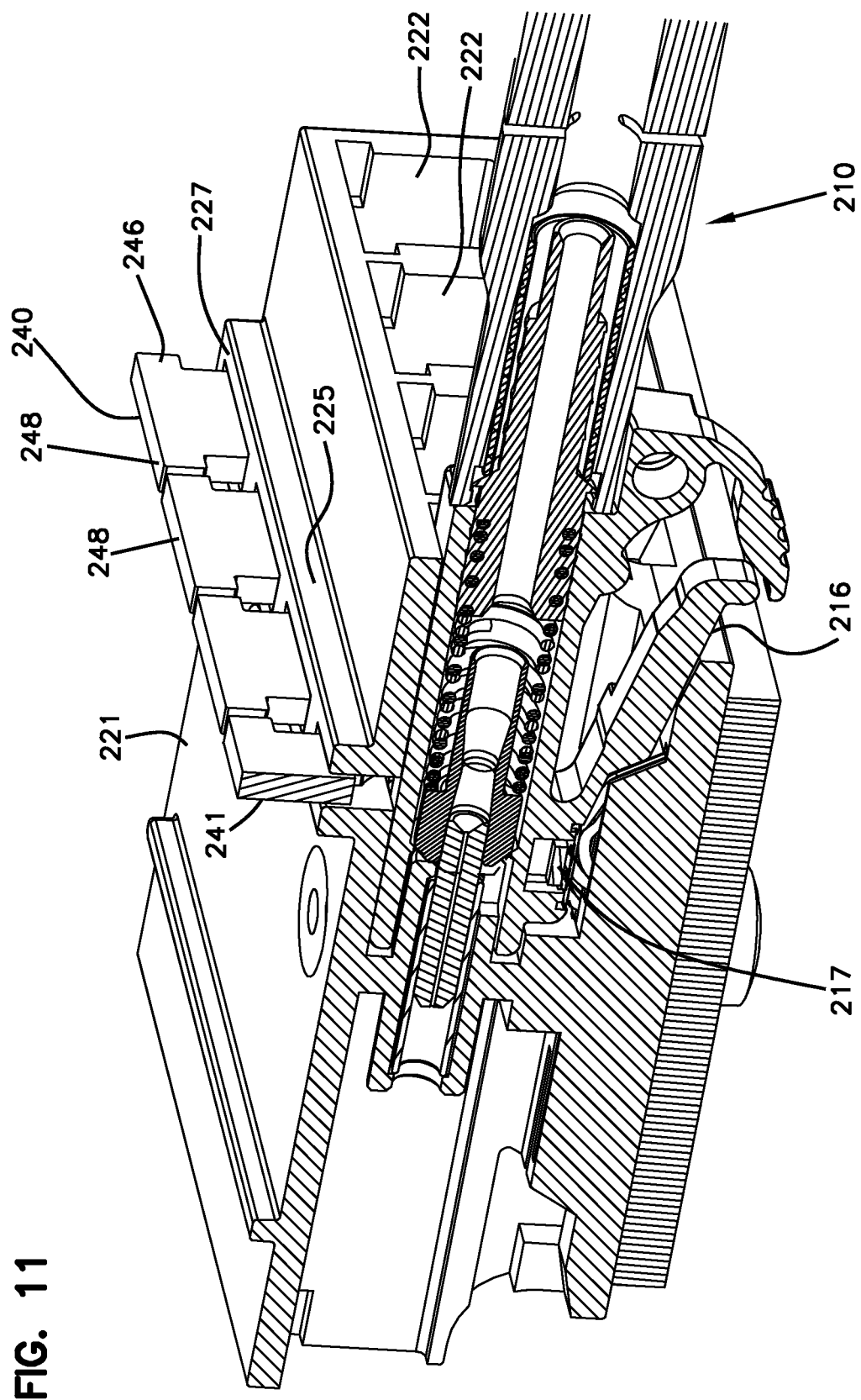
FIG. 11 is an axial cross-sectional view of the optical adapter of FIG. 5 with the optical connector plugged into one of the ports and the stop members in the locked position.
Figure 12:
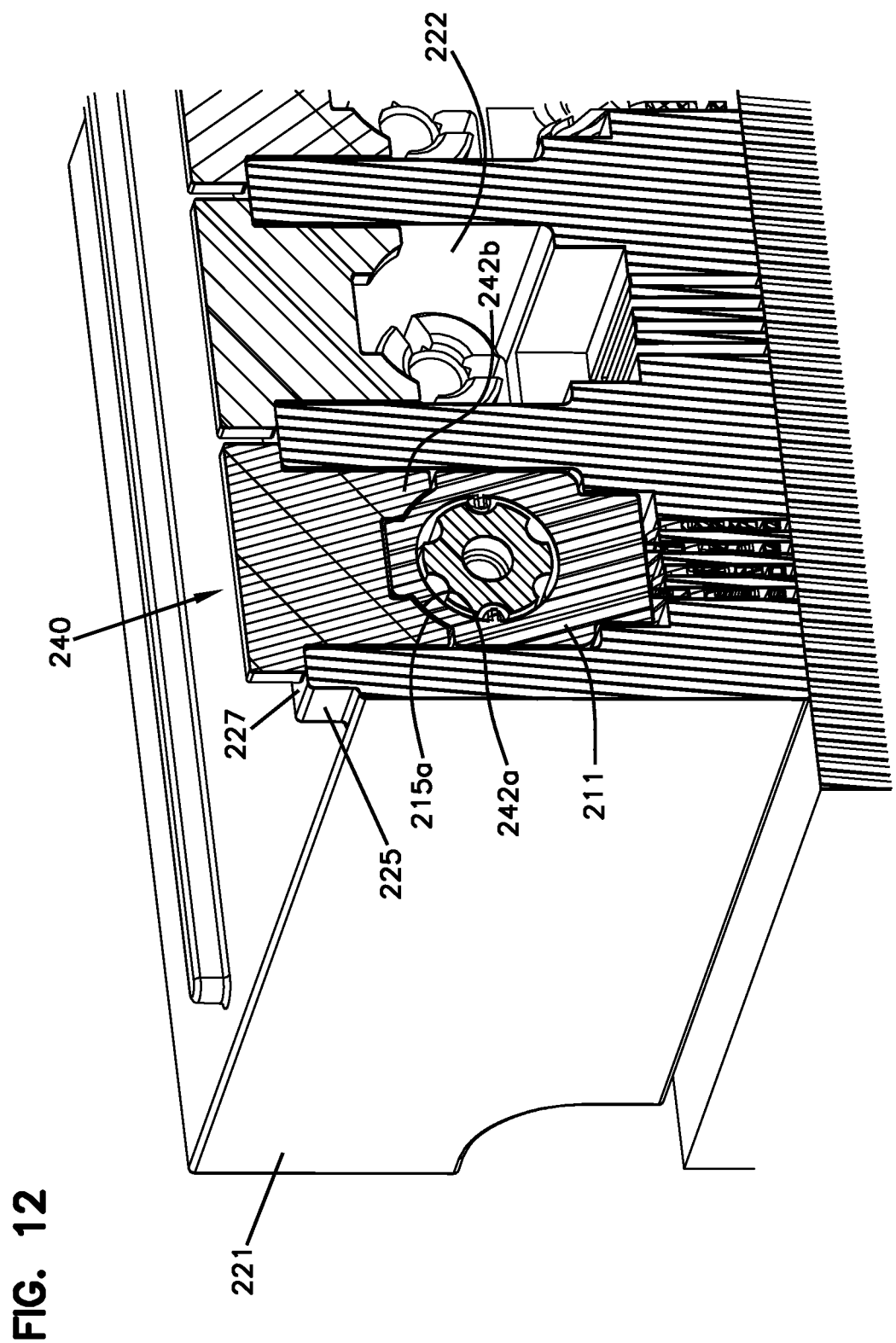
FIG. 12 is a lateral cross-sectional view of the optical adapter and optical connector of FIG. 11.
Figure 13:
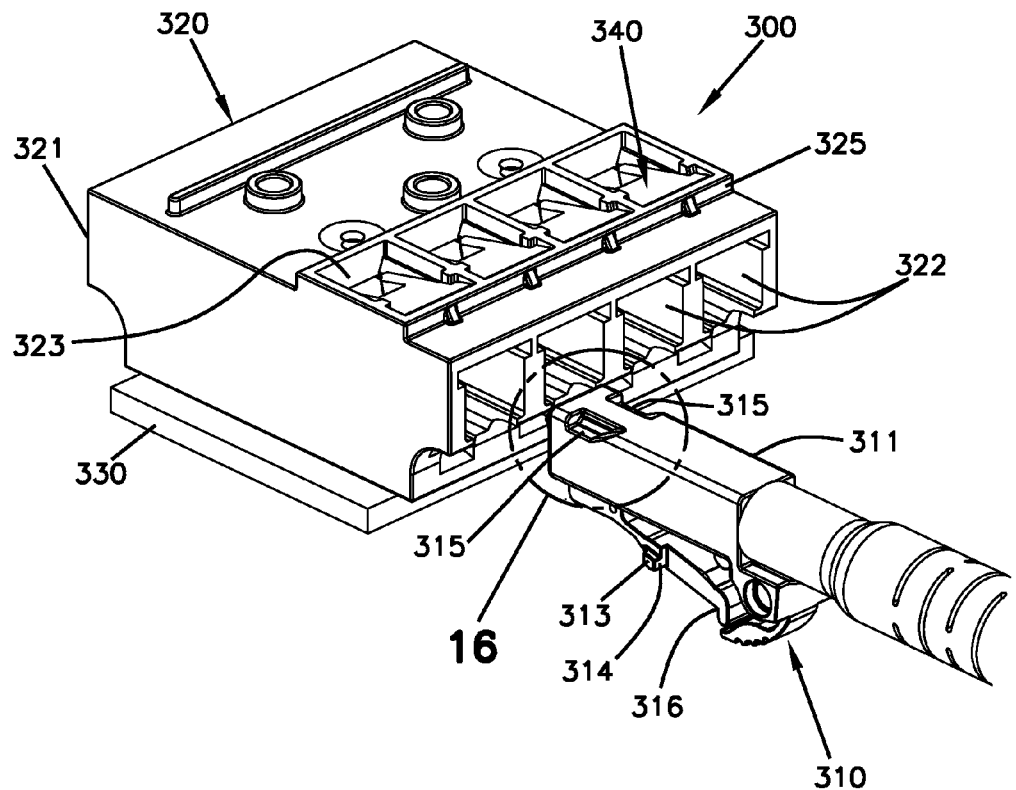
FIG. 13 is a front perspective view of another example implementation of a connector system including an optical connector being inserted into an optical adapter having movable stop members.

FIGS. 9 and 10 illustrate the optical connector 210 inserted within an adapter port 222 with the stop members 240 disposed in the unlocked position. Each of the stop members 240 is raised so that the arms 248 are spaced from the support wall 227 of the support region 225. The engagement end 245 of the stop members 240 is spaced from the notches 215 of the plug 210. FIGS. 11 and 12 illustrate the connector 210 locked in the adapter port 222 by a stop member 240. The legs 242a, 242b (FIG. 12) are disposed in the corner notches 215a, 215b. The plug-facing surface 243 seats on the first side 211a of the plug body 211. The arms 248 of the stop member 240 seat on the support wall 227 of the support region 225.

As shown in FIGS. 9 and 11, one or more of the connectors 210 may include a storage device 217 that stores information (e.g., physical layer information). In some implementations, the storage device 217 includes conductive contacts that engage electrical contacts 229 disposed in the adapter 220. In other implementations, the storage device 217 may include or form part of an RFID tag that communicates with an RFID reader in the adapter 220. The information is communicated from the reader to a data management system via a circuit board 230.

FIGS. 13-24 illustrate another example of a connector system 300 including an optical connector 310 being inserted into an optical adapter 320 having movable stop members 340. The optical adapter 320 includes an adapter body 321 defining at least one port 322 that extends into the adapter body 321. In the example shown, the adapter body 321 defines four ports 322 at a front side and four ports 322 at a rear side. In other implementations, however, the adapter body 321 may define two ports, three ports, eight ports, twelve ports, or any desired number of ports 322.

Figure 16:
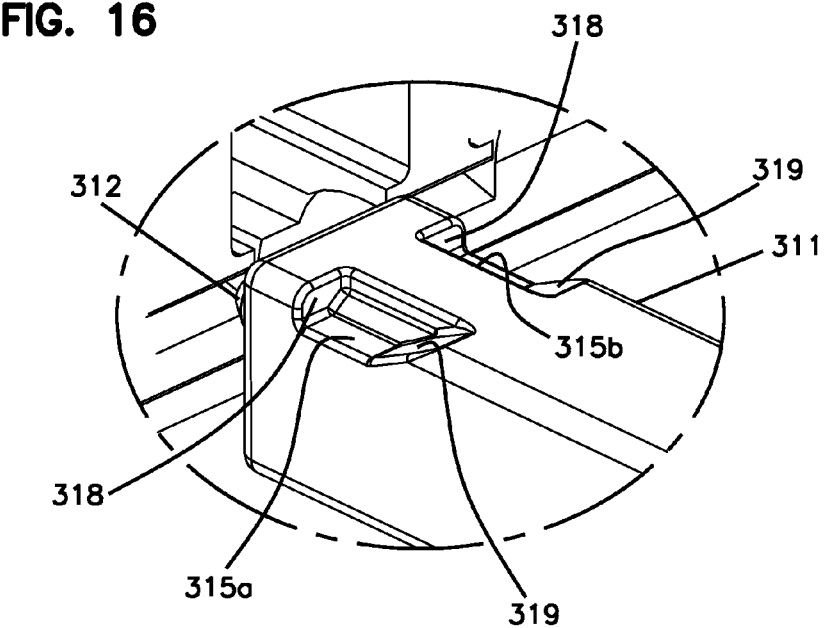
FIG. 16 is an enlarged view of a section of the plug shown in FIG. 13.

The optical connector 310 includes a connector body 311 holding a ferrule 312 at which an optical fiber is terminated. A latch arm 316 extends from the connector body 311 and defines lug 313 having abutment surfaces 314 as described above. The optical connector 310 also includes a notch arrangement 315. In the example shown, the notch arrangement 315 includes a first corner notch 315a and a second corner notch 315b that are located at opposite ends of one side 311a of the connector 310 (see FIG. 17). As shown in FIG. 16, each notch 315 may define a locking surface 318 and a ramped or otherwise contoured surface 319. In other implementations, the notch arrangement 315 may include a greater or lesser number of notches 315 defined in any desired surface of the connector 310.

At least one stop member 340 is moveable coupled to the optical adapter 320 to selectively lock the connector 310 within an adapter port 322. In some implementations, the adapter 320 includes a stop member 340 for each port 322 (e.g., see FIG. 14). In other implementations, the adapter 320 includes a stop member 340 for each port 322 at only one side (e.g., the front or the rear) of the adapter 320. In the example shown, the adapter 320 includes four stop members 340 that are associated with the front ports 322 of the adapter 320.

Figure 14:
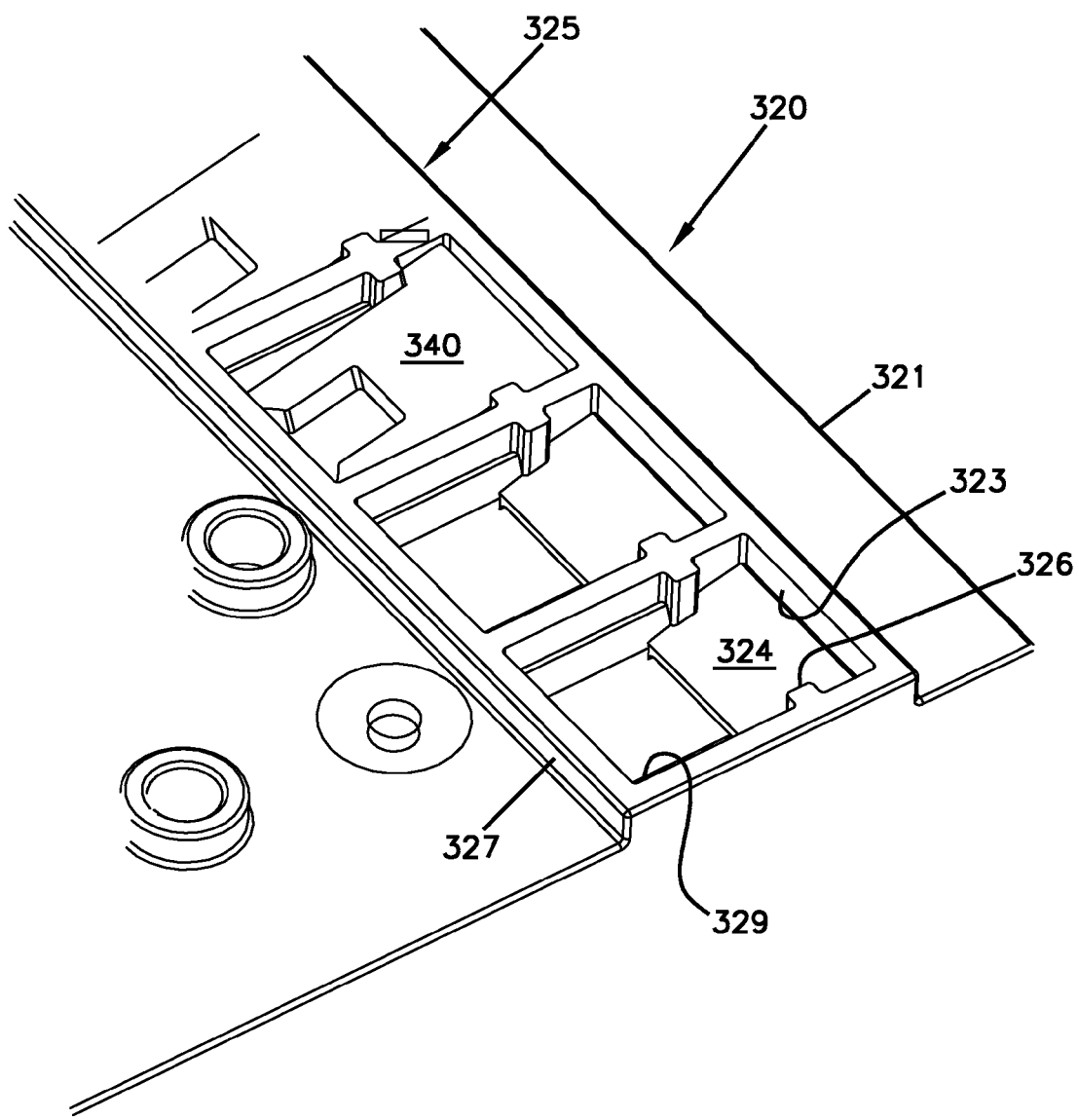
FIG. 14 is an enlarged top view of a section of the adapter shown in FIG. 13.
Figure 15:
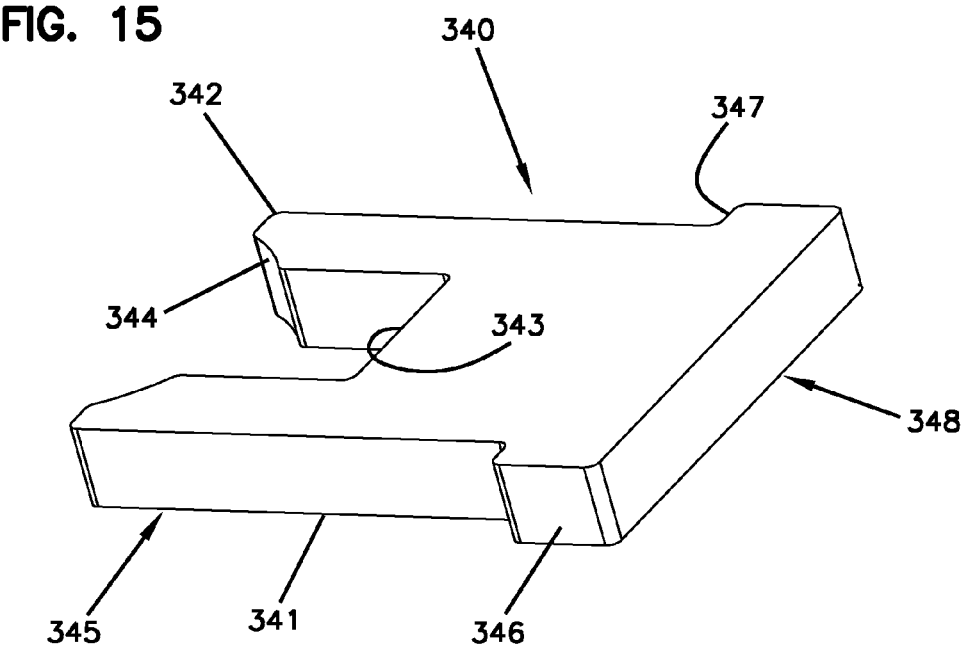
FIG. 15 is a perspective view of the stop member shown in FIG. 13.
Figure 17:
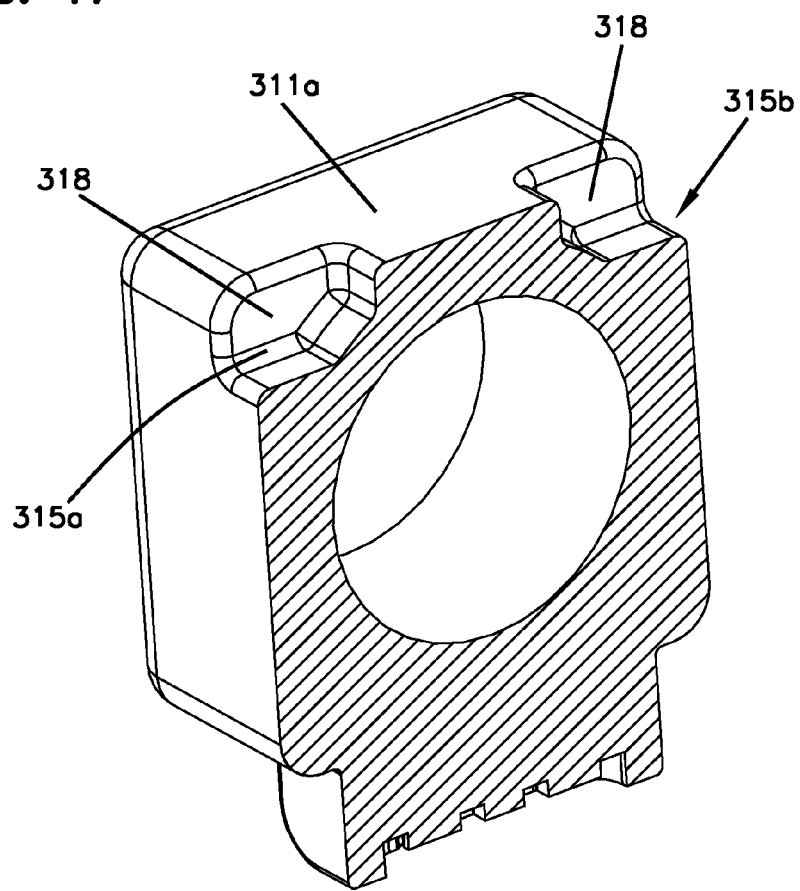
FIG. 17 is a perspective view of the plug of FIG. 13 showing a transverse cross-sectional profile of the plug.

As shown in FIG. 14, a support region 325 defines one or more cavities 323 in which the stop members 340 may be disposed. The cavities 323 are recessed into the adapter 320. In some implementations, each stop member 340 is disposed in a corresponding cavity 323. In other implementations, the stop members 340 are disposed in one large cavity 323. Each cavity 323 defines a through-opening 329 that connect the cavity 323 with at least one of the ports 322. Support surfaces 324 are disposed within the passages 323 and extend across portions of the passages 323 to retain the stop members 340. Lugs 326 extend laterally into each passage 323 towards the respective support surface 324. The top of the support region 325 forms a support wall 327 around a perimeter of the support region 325.

The stop members 340 are disposed within the passages 323. Each stop member 340 includes a stop body 341 having an engagement end 345 and an actuation end 348. An actuation end 348 of each stop member 340 seats on the support surface 324 within the passage 323. The actuation end 348 includes arms 346 that extend laterally outwardly from the stop body 341. Each arm 348 defines an abutment surface 347 that abuts a lug 326 extending laterally into the passage 323 to maintain the stop member 340 at the support surface 324. The engagement end 345 extends towards the passage 323.

Figure 18:
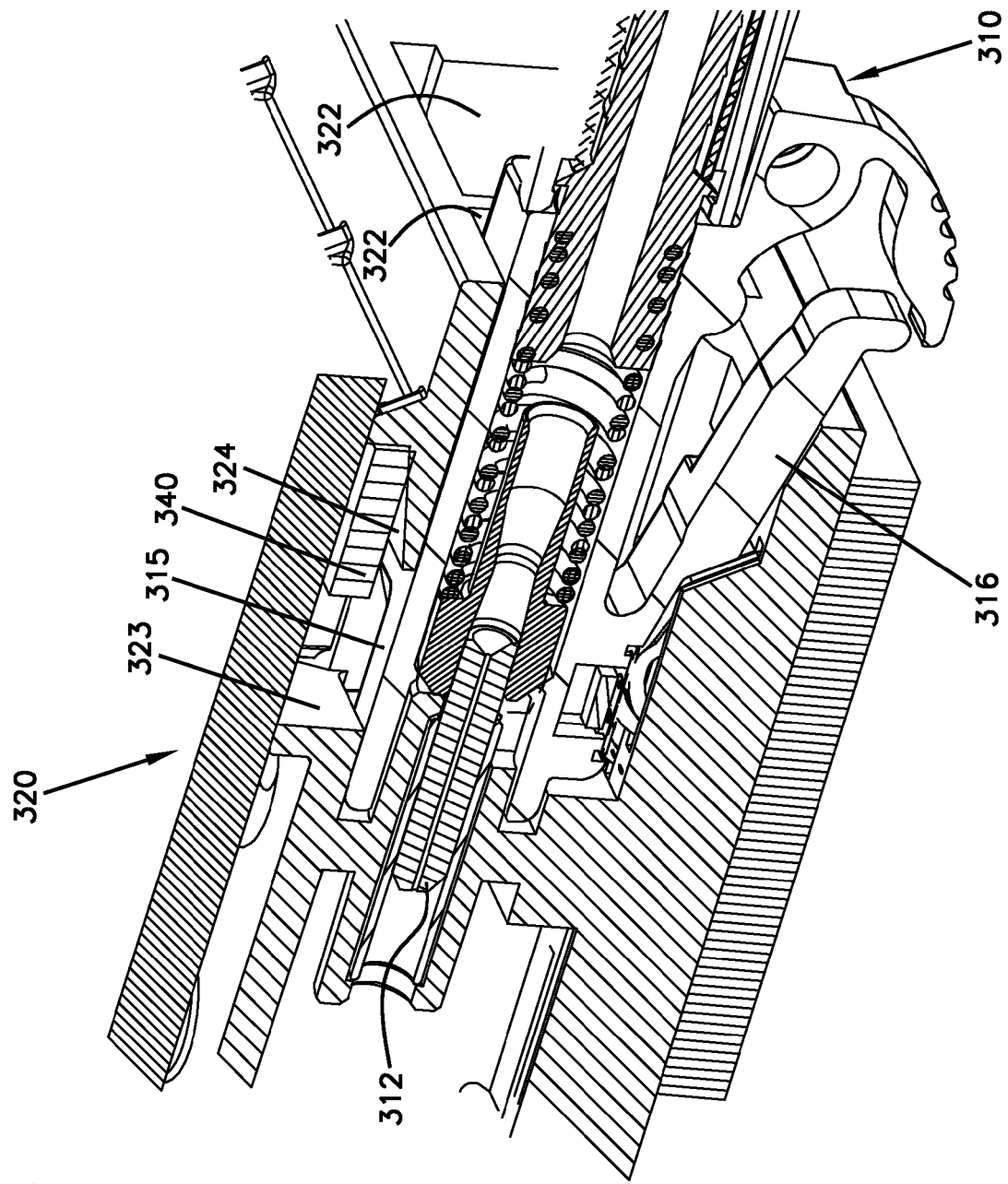
FIG. 18 is a perspective view of a plug inserted at an adapter port shown in cross-section so that a stop member is shown in an unlocked position.
Figure 19:
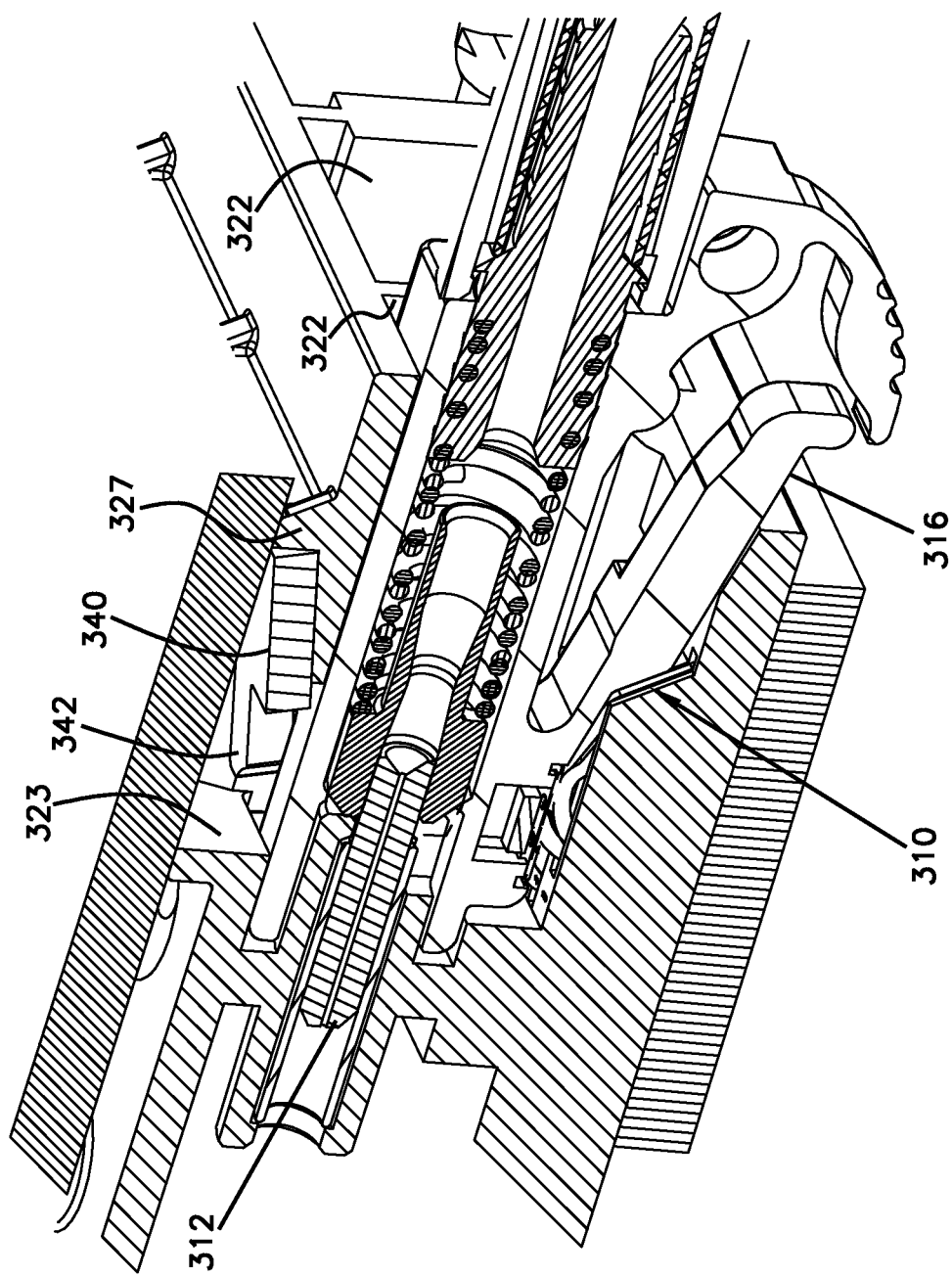
FIG. 19 is a perspective view of a plug inserted at an adapter port shown in cross-section so that a stop member is shown in a locking position.

The stop members 340 are configured to move (e.g., pivot) relative to the adapter housing 321 between a locking position (FIG. 19) and an unlocked position (FIG. 18). When the stop member 340 is in the unlocked position, the engagement end 345 of the stop member 340 does not extend sufficiently into the adapter port 322 to interface with a plug connector 310 received at the adapter port 322. In certain implementations, the engagement end 345 does not enter the port 322 when the stop member 340 is in the unlocked position. For example, the stop member 340 may extend generally horizontal to an insertion axis of the connector 310 within the port 322.

When in the locking position, an engagement end 345 of the stop member 340 extends through the passage 323 and into one of the ports 322. The engagement end 345 of the stop member 340 is sized and shaped to extend into the notch arrangement 315 of the plug 310 when the stop member 340 is in the locking position. In the example shown in FIG. 15, the engagement end 345 of the stop member 340 includes two legs 342 that extend downwardly from a plug-facing surface 343. In some implementations, the plug-facing surface 343 seats on the first side 311a of the plug body 311 when the plug 310 is locked. In other implementations, the plug-facing surface 343 is spaced from the plug body 311 even when the legs 342 extend into the plug notches 315. In certain implementations, contours 344 are cut into inner sides of the legs 342 to match the contours of the corner notches 315a, 315b (see FIGS. 22 and 24).

Figure 20:
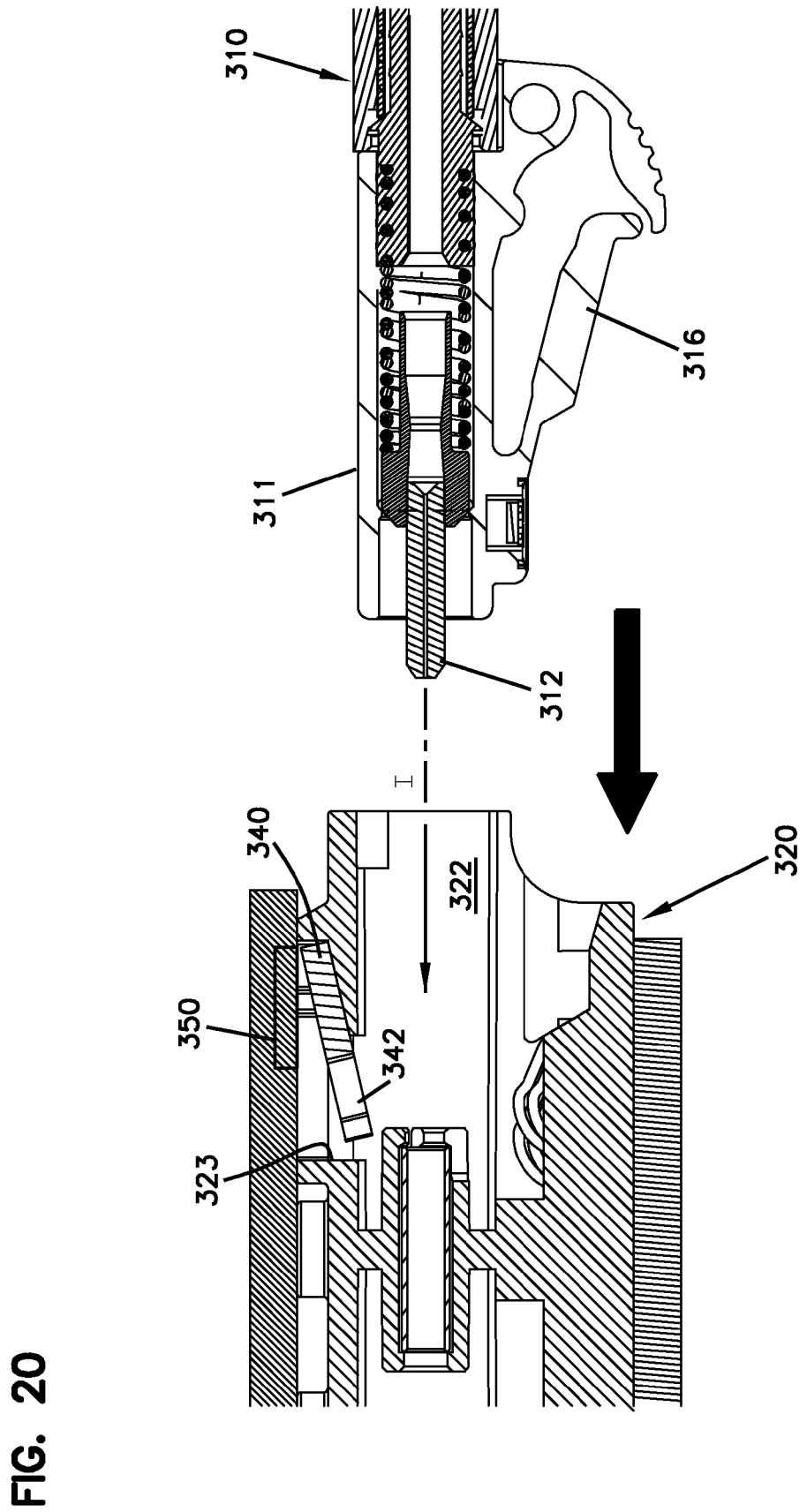
FIG. 20 is a longitudinal cross-sectional view of the adapter of FIG. 13 with the stop member in the locking position and the plug aligned for insertion into a port.
Figure 21:
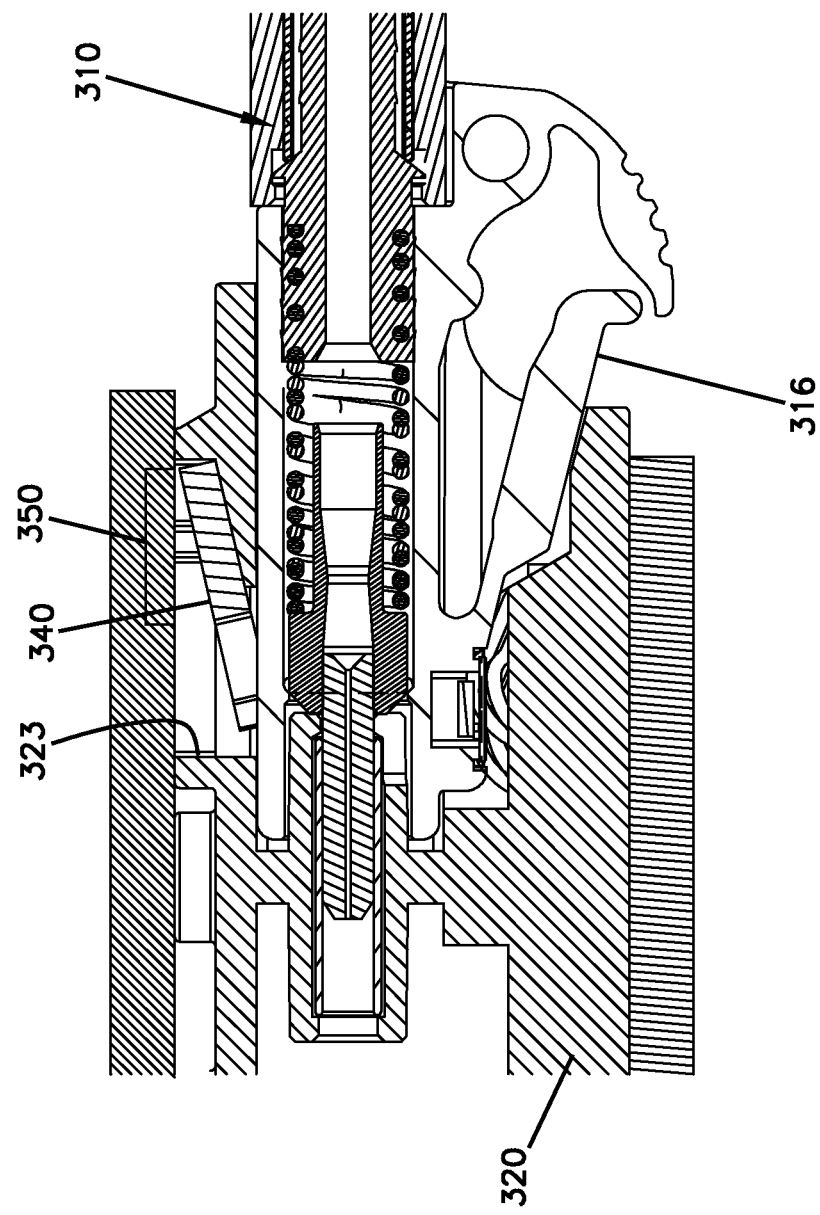
FIG. 21 is a longitudinal cross-sectional view of the adapter of FIG. 13 with the plug disposed in the port and the stop member engaged with the notches in the locking position.
Figure 23:
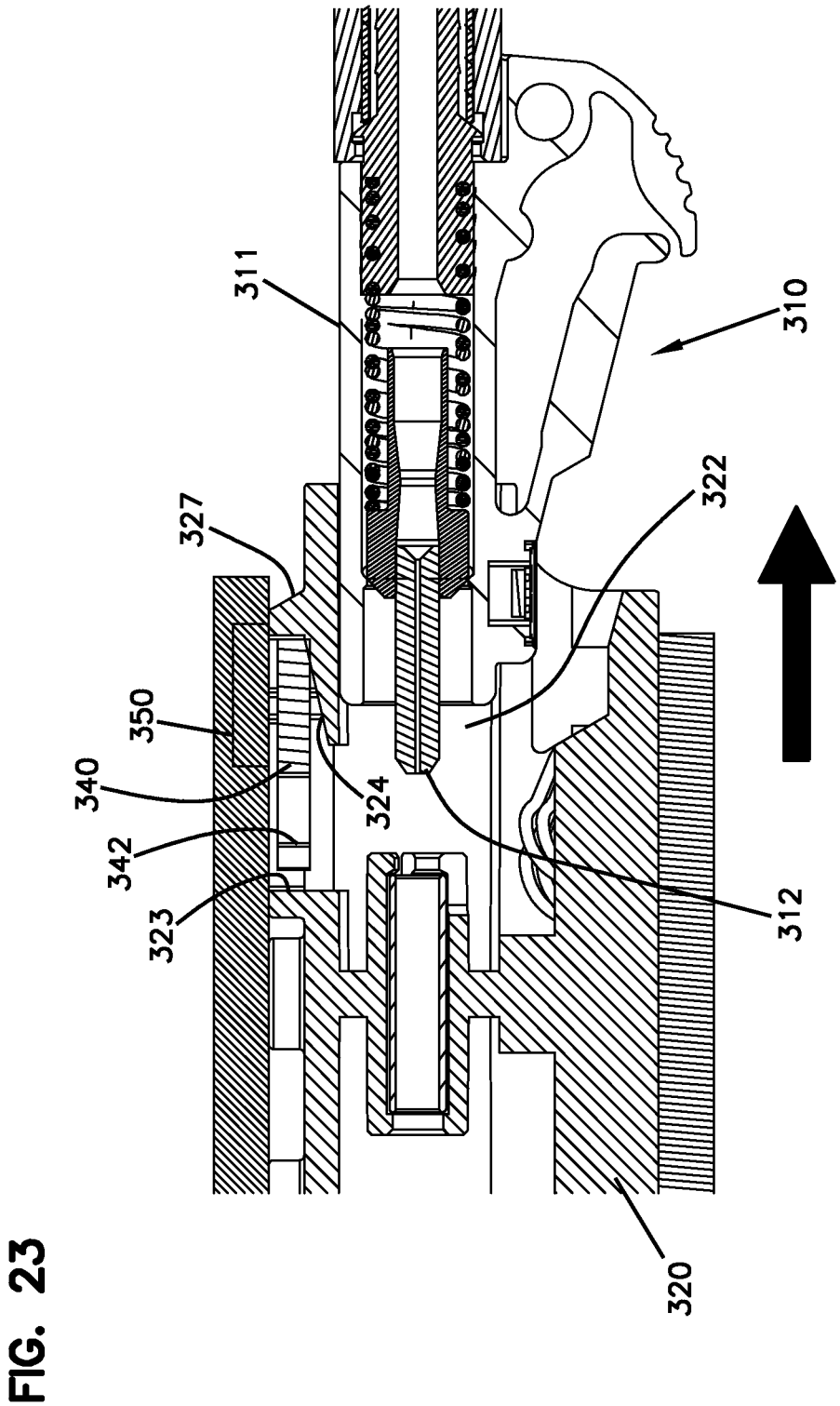
FIG. 23 is a longitudinal cross-sectional view of the adapter of FIG. 13 with the plug disposed in the port and the stop member in the unlocked position.

In some implementations, the stop members 340 are controlled by actuators 350 (FIGS. 20, 21, and 23). Non-limiting examples of suitable actuators 350 include mechanical actuators, electrical actuators, electro-magnetic actuators, electro-static actuators, thermal actuators, etc. In other implementations, the stop members 340 may be spring-biased towards the locked position. In certain implementations, an actuator (e.g., a micro-actuator) 350 may releasably retain the stop member 340 against the bias of the spring until triggered.

FIGS. 20-24 illustrate the insertion and removal of the plug 310 into and from a port 322 of the adapter 320. In the example shown in FIG. 20, the plug 310 is disposed outside of the port 322 and is moving towards the port 322 along an insertion axis I. In some implementations, the stop member 340 disposed at the port 322 is in the locking position. For example, the engagement end 345 of the stop member 340 extends from the passage 323 sufficiently into the port 322 to interact with the plug body 311 when the plug body 311 is inserted at the port 322. In certain implementations, an actuator 350 positions the stop member in the locking position. In other implementations, the stop member 340 is spring-biased into the locking position. In still other implementations, the stop member 340 may be disposed in the unlocked position prior to insertion of the plug 310 at the port 322.

Figure 22:
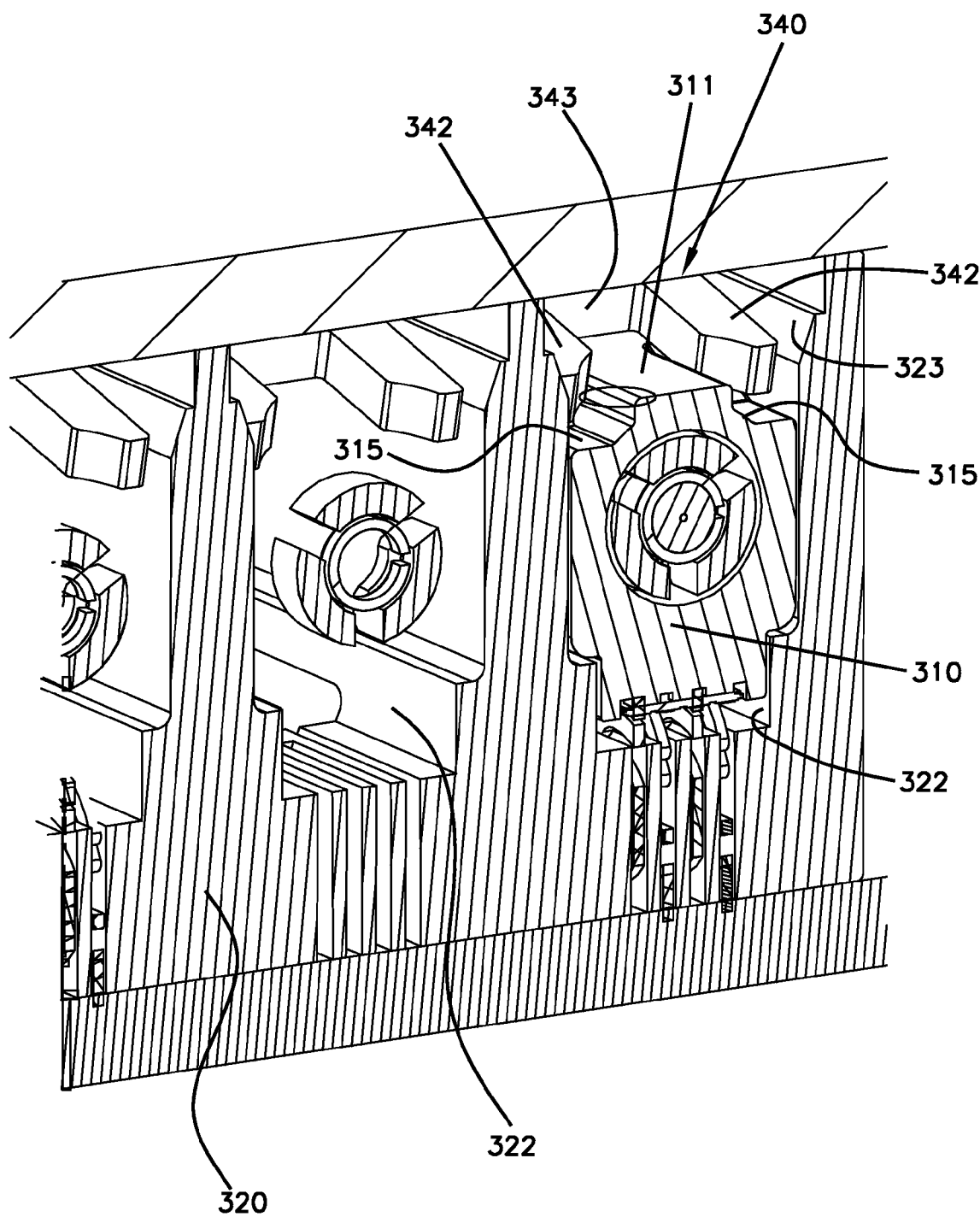
FIG. 22 is a perspective view of the adapter and plug of FIG. 21 shown in transverse cross-section to that legs of the stop member are visible.

As shown in FIGS. 21 and 22, the plug body 311 slides past the stop member 340 when the plug 310 is inserted at the port 322. In some implementations, the plug body 311 engages the engagement end 345 of the stop member 340 and pushes (e.g., cams) the stop member 340 towards the unlocked position sufficient to enable the plug body 311 to enter the port 322. In some implementations, the stop member 340 is spring biased towards the locking position. The plug body 311 overcomes the bias of the spring to move the stop member 340 towards the unlocked position. In other implementations, the actuator 350 applies a force (e.g., magnetic, electrical, thermal, mechanical) to the stop member 340 that is overcome by the insertion movement of the plug body 311. In still other implementations, the stop member 340 is moved to the locking position by gravity.

The engagement end 345 of the stop member 340 rides of the front of the plug 310 until snapping, falling, or otherwise entering the notch arrangement 315 defined in the plug 310. In certain implementations, the legs 342 of the stop member 340 each enter one of the notches 315 of the plug 310 so that end surfaces of the legs 342 engage the locking surfaces 318 defined by the notches 315. If a removal force is applied to the plug 310 (and the plug latch 316 is depressed), then the engagement between the legs 342 and the locking surfaces 318 maintain the plug 310 within the port 322. The locking surfaces 318 are shaped and oriented to not cause movement of the stop member 340 towards the unlocked position. In the example shown, the locking surfaces 318 are generally flat and oriented transverse to the insertion axis I of the plug 310. In certain implementations, the legs 342 can rest against the ramped surfaces 319 of the notches 315.

Figure 24:
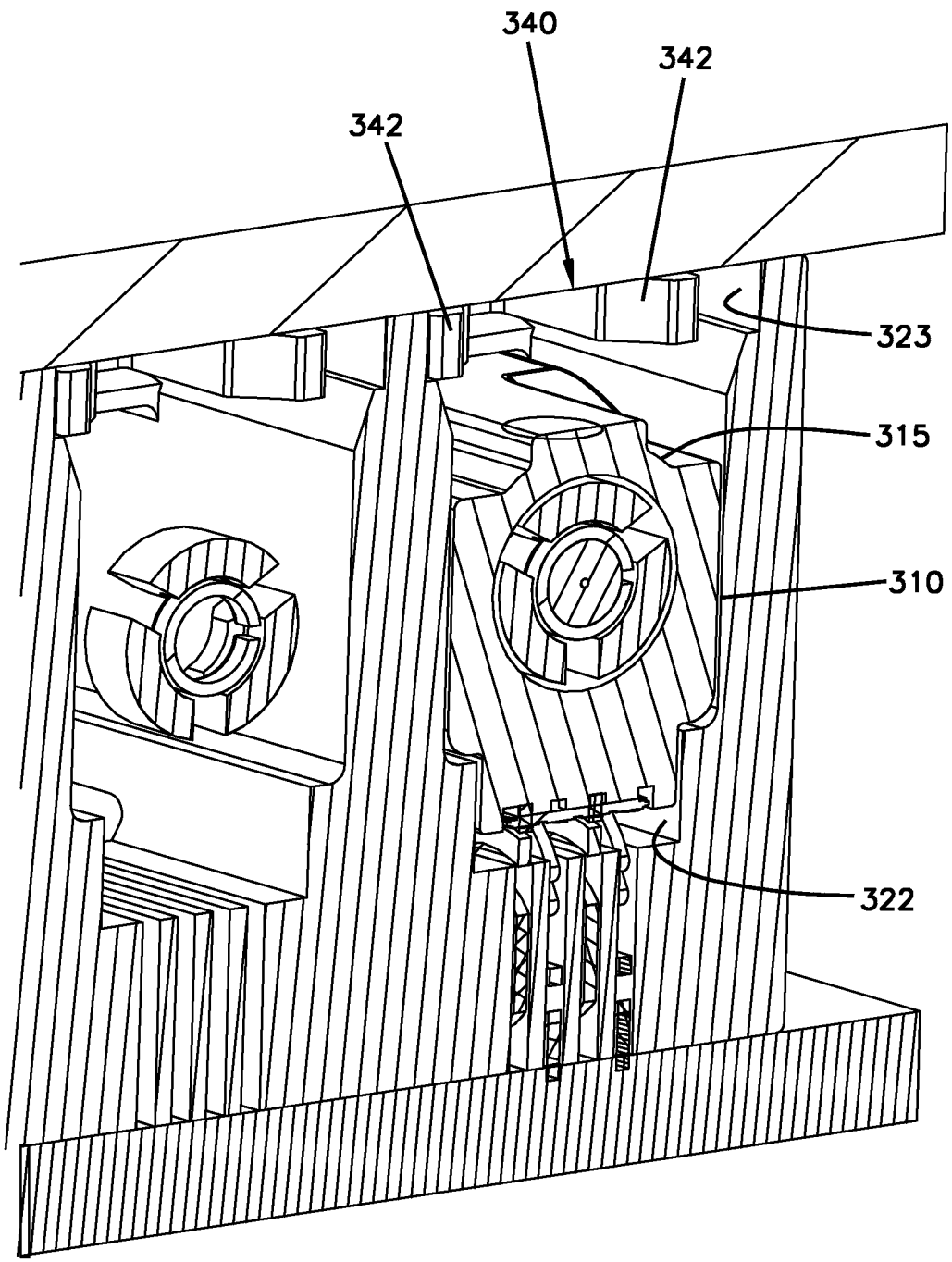
FIG. 24 is a perspective view of the adapter and plug of FIG. 23 shown in transverse cross-section to that legs of the stop member are visible.

As shown in FIGS. 23 and 24, the stop member 340 is moved to the unlocked position to enable removal of the plug 310. In some implementations, the actuator 350 moves the stop member 340 to the unlocked position. In certain implementations, the actuator 350 moves the stop members 340 in response to a request made by a user through a data management network as will be described in more detail herein. When in the unlocked position, the legs 342 of the stop member 340 clear the notches 315 of the plug 310 and no longer engage with the locking surfaces 318. Accordingly, if a removal force is applied to the plug 310 and the plug latch 316 is depressed, then the plug 310 is moved out of the port 322.

If a plug (e.g., a conventional plug) without notches 315 is inserted into the adapter port 322, then the plug body will push/cam the stop member 340 towards the unlocked position to enable the plug 310 to enter the port 322. However, since the plug does not define notches 315, the stop member 340 will not engage the plug 310. Accordingly, the stop member 340 will not retain such a plug within the port 322. Rather, a plug latch will retain the plug within the port 322 until the latch is manually depressed.

Figure 25:
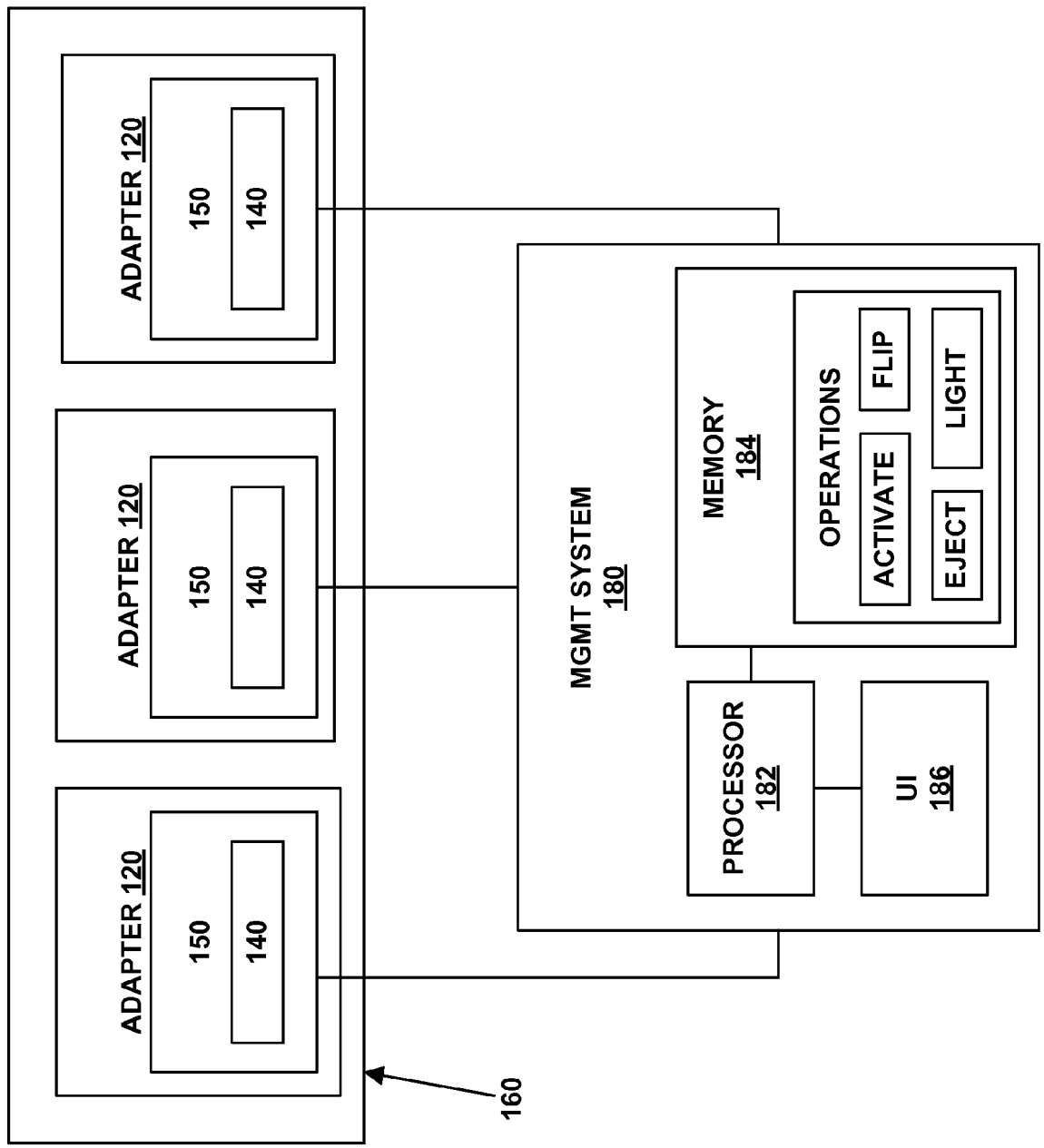
FIG. 25 is a schematic block diagram of an example management system that is operationally coupled to equipment including one or more optical adapters that are configured in accordance with the principles of the present disclosure.

Referring now to FIG. 25, one or more adapters 120 may be coupled together to form communications equipment 160 (e.g., a blade, a panel, etc.). In some implementations, the actuators 150 are controlled by a management system 180. For example, the management system 180 determines when the stop member 140 is moved to the locked position and when the stop member 140 is moved to the unlocked position. Accordingly, the management system 180 determines when the connector 110 is secured to the adapter 120 and when the connector 110 is releasable from the adapter 120.

In some implementations, the management system 180 includes a local processor coupled to the adapter 120 or equipment including the adapter. In other implementations, the management system 180 includes a remote processor 182 coupled to the adapter 120 or equipment including the adapter 120. The management system 180 also includes memory 184 that may store processes or operation implemented by the processor 182. The management system 180 also may include a user interface module 186 with which one or more users communicate with the management system 180. Additional details regarding example management systems suitable for use in controlling the actuator 150 as described in more detail below are disclosed in U.S. patent application Ser. No. 13/025,841, filed Feb. 11, 2011, and titled "Managed Fiber Connectivity Systems," the disclosures of which are hereby incorporated herein by reference.

In general, when a connector 110 is inserted into an adapter port, the management system 180 determines whether to authorize the insertion. If the insertion is authorized, then the connector 110 is latched in the adapter port. If the insertion is not authorized, then the connector 110 is not latched within the port. In some implementations, authorization is granted if the management system 180 expected a connection to be made at the port and the connector 110 matches predetermined criteria. In other implementations, a connector 110 need not be authorized and is automatically locked to the port when inserted into the port.

In some implementations, the management system 180 also controls an indicator arrangement mounted to the adapters 120 or to equipment including the adapters 120. In some implementations, each adapter 120 of the equipment 160 includes an indicator (e.g., an LED) with which the user's attention may be drawn to a particular adapter 120 on the equipment 160. In other implementations, the equipment 160 may include a display screen on which port identification (e.g., labels) may be listed. In still other implementations, the communications equipment 160 may be configured to otherwise identify a selected one of the adapters 120. The management system 180 determines when the indicator for each adapter 120 is activated (e.g., lit) and deactivated.

FIG. 26 is a flowchart illustrating an operational flow for an example insertion process 500 by which a user may plug a fiber optic connector 110, 210 into an adapter 120, 220. The process steps may be implemented by one or more users. In certain implementations, the process steps herein described may occur at different times and/or locations. The insertion process 500 begins at a start module 502 and proceeds to an access operation 504.

During the access operation 504, the user communicates with the management system 180. In some implementations, the user may communicate with the management system 180 via a direct connection to the user interface module 186. In other implementations, the user may communicate with the management system 180 via a networked computer or handheld processing device (e.g., smart phone, PDA, etc.) that is remotely connected (e.g., via a LAN, a WAN, the Internet, or another network) to the management system 180.

During a select operation 506, the user identifies the adapter port 122, 222 at which the user wants to insert the connector 110, 210. For example, in some implementations, the user may view a port map and identify the port at which the connection should be made. In certain implementations, the port map is graphically displayed and the user selects an area on the graphic display. In other implementations, the user may type or otherwise provide a port identification (e.g., a unique identification number) to the management system 180.

In some implementations, the user also may provide the management system 180 with identifying characteristics of the connector 110, 210 to be inserted. For example, the user may provide a unique identification number associated with the connector 110, 210. In other implementations, the user may provide a cable type, connector type, or other physical feature associated with the connector 110, 210. In still other implementations, the user may indicate that the connector 110, 210 to be received is a managed connector (i.e., a connector 110, 210 that includes memory storing physical layer information thereabout).

At an insert operation 508, the user pushes the connector 110, 210 into an adapter port 122, 222. The user holds the connector 110, 210 in the adapter port 122, 222 (see hold operation 510) until the management system 180 indicates that an action has been taken. In some implementations, the action includes latching the connector 110, 210 into the adapter port 122, 222 if the management system 180 determines that insertion is authorized as disclosed in more detail below. In other implementations, the action includes issuing an alarm or error if the management system 180 determines that insertion is not authorized as disclosed in more detail below.

The insertion operation 500 performs any appropriate completion procedures and ends at a stop module 512.

Figure 27:
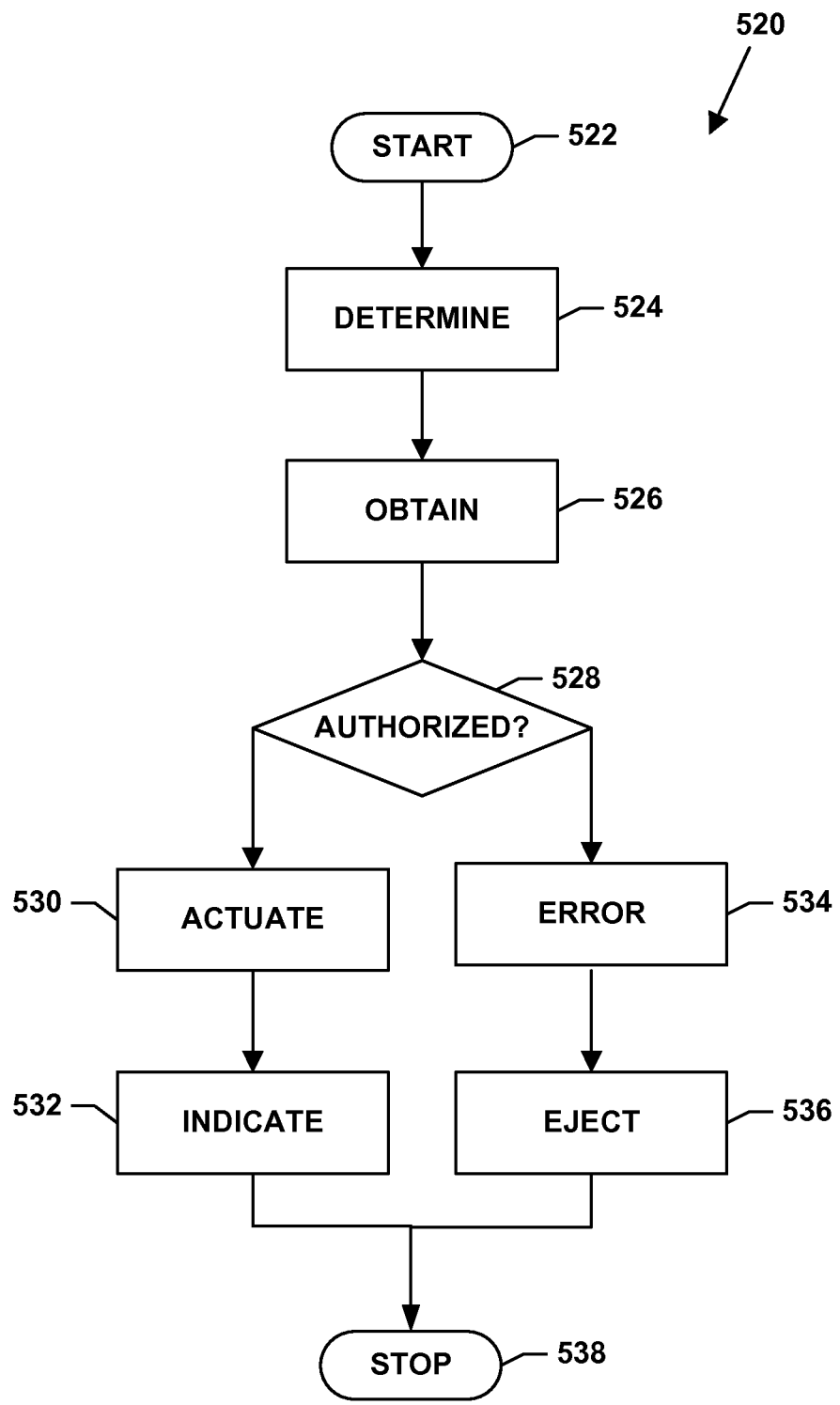
FIG. 27 is a flowchart illustrating an insertion authorization process by which the management system may decide whether or not to latch a connector within an optical adapter.

FIG. 27 is a flowchart illustrating an operational flow for an authorization process 520 by which the management system 180 determines whether or not a connector insertion is appropriate. The process steps may be implemented by one or more processors associated with the management system 180. In certain implementations, the process steps are implemented locally at the adapter 120, 220 or adapter equipment. In other implementations, the process steps are implemented at a location remote from the adapters 120, 220. The insertion authorization process 520 begins at a start module 522 and proceeds to a determine operation 524.

The determine operation 524 determines that a connector 110, 210 has been or is being inserted into one of the adapters 120, 220 associated with the management system 180. For example, the management system 180 may determine that a switch has been opened or closed, thereby indicating that a connector 110, 210 has been inserted into the adapter 120, 220. The determine operation 524 may be implemented during or after insertion of the connector 110, 210 into the adapter 120, 220. In the example adapter 220 shown in FIG. 9, the connector 210 pushes against electrical contacts 229 when inserted, thereby completing a circuit between the contacts 229 and a printed circuit board 230 associated with the adapter 220. In other implementations, however, other types of presence sensors (e.g., pressure sensors, light sensors, etc.) may be utilized.

An obtain operation 526 reads or attempts to read data stored in the memory of the connector 110, 210. If the connector 110, 210 being inserted includes memory 217, then the obtain operation 526 retrieves some or all of the data stored in the memory and sends the data to the management system 180 for processing. In some implementations, the data is sent to a local processor at the adapter equipment. In other implementations, the data is sent to a remote processor. In some implementations, the obtain operation 526 retrieves a unique identifier associated with the connector 110, 210. In other implementations, the obtain operation 526 retrieves physical layer information (e.g., cable type, cable length, connector type, insertion count, security clearance, etc.) pertaining to the connector 110, 210 or cable terminated thereat.

A determination module 528 implemented by the management system 180 determines whether the insertion of the connector 110, 210 at the adapter port 122, 222 should be allowed. For example, in some implementations, the management system 180 determines whether a unique identifier read from the connector memory 217 matches an expected unique identifier provided by a user prior to the insertion. In other implementations, the management system 180 determines whether other types of data read from the memory 217 matches the expected data (e.g., whether the connector 110, 210 is the expected connector type, whether the connector 110, 210 terminates a cable of the expected cable type, whether the connector 110, 210 is associated with the expected security clearance, etc.).

If the management system 180 determines that authorization should be provided, then the management system 180 temporarily triggers the actuator 150, 250 to move the stop member 140, 240 at an actuate operation 530. For example, the management system 180 may trigger the actuator 150, 250 to lower the stop member 140, 240 into the notch arrangement 115, 215 of the connector 110, 210. The management system 180 also may activates an indicator associated with the adapter port 122, 222 or adapter equipment at an indicate operation 532. For example, in one implementation, the management system 180 may light an LED or other light source associated with the port 122, 222. Activating the indicator tells the user that the connector 110, 210 has been latched.

Alternatively, if the management system 180 determines that authorization should not be provided, then the management system 180 implements an error operation 534 at which the user is informed that authorization is not granted. In some implementations, the error operation 534 does not light an indicator light (e.g., LED) associated with the port. In other implementations, the error operation 534 activates the indicator light with a warning color (e.g., red) or pattern (e.g., flashing). In certain implementations, the error operation 534 sounds an auditory alarm. In certain implementations, the error operation 534 sends an alert message to the user or to an administrator of the management network or security personnel.

In some implementations, the management system 180 implements an eject operation 536 at which the management system 180 instructs the adapter 120, 220 to physically push or otherwise attempt to force the connector 110, 210 out of the port 122, 222. An ejector applies a pressure to the connector 110, 210 to push the connector 110, 210 sufficiently out of the port 122, 222 to prevent transmission of a signal from or to the connector 110, 210. In certain implementations, the ejector pushes the connector 110, 210 completely outside of the adapter port 122, 222.

The insertion authorization operation 520 performs any appropriate completion procedures and ends at a stop module 538.

In general, a connector 110, 210 may be removed from an adapter port 122, 222 when the management system 180 determines that such a removal is authorized. A user provides a request to the management system 180 that a particular connector 110, 210 be unlatched to facilitate removal of the connector 110, 210 from the port 122, 222. When ready to remove the connector 110, 210, the user signals the management system to unlatch the connector 110, 210. The management system 380 unlatches the requested connector 110, 210.

FIG. 28 is a flowchart illustrating an operational flow for an example removal process 550 by which a user may pull or otherwise remove a fiber optic connector 110, 210 from an adapter port 122, 222. The process steps may be implemented by one or more users. In certain implementations, the process steps herein described may occur at different times and/or locations. The removal process 550 begins at a start module 552 and proceeds to an access operation 554.

During the access operation 554, the user communicates with the management system 180. In some implementations, the user may communicate with the management system 180 via a direct connection to the user interface module 186. In other implementations, the user may communicate with the management system 180 via a networked computer or handheld processing device (e.g., smart phone, PDA, etc.) that is remotely connected (e.g., via a LAN, a WAN, the Internet, or another network) to the management system 180.

During a select operation 556, the user identifies the adapter port 122, 222 from which the user wants to remove the connector 110, 210 and/or the user identifies the connector 110, 210 that the user wants to remove. For example, in some implementations, the user may view a port map and identify the port at which the disconnection should be made. In certain implementations, the port map is graphically displayed and the user selects an area on the graphic display. In other implementations, the user may type or otherwise provide a port identification (e.g., a unique identification number) and/or a connector identification to the management system 180.

At an indicate operation 558, the user pushes a button or otherwise actuates an input member to provide an indication to the management system 180 that the user is ready to remove a connector. In some implementations, the user pushes a button that is associated with multiple adapters 120, 220 on a piece of adapter equipment. In other implementations, the user pushes a button associated with a particular adapter port 122, 222. In some implementations, the user directly depresses the button with a finger of the user. In other implementations, the user indirectly actuates the button as will be described in more detail herein.

In still other implementations, the user indicates readiness using a biometric device (e.g., a fingerprint scanner). In such implementations, the biometric device analyzes biometric data (e.g., a scanned fingerprint) to identify the user. The management system 180 may check whether the identified user is authorized to remove the connector 110, 210 or otherwise modify the connections of the system.

The user pushes the connector 110, 210 forwardly into the adapter port 122, 222 (see push operation 560) until the management system 180 indicates (e.g., via indicator) that an action has been taken. By pushing the connector 110, 210 forwardly, the user removes stress on the latch 116, 216. In some implementations, the action includes unlatching the connector 110, 210. In certain implementations, the action may include ejecting the connector 110, 210 from the port 122, 222. In other implementations, the action may include issuing an alarm or error. In some implementations, the user implements the push operation 560 before the indicate operation 558.

In other implementations, the user implements the indicate operation 558 and the push operation 560 at the same time. For example, an internal input member may be disposed within an adapter port 122, 222. In one example implementation, the internal input member is a micro-switch that is electrically connected to the circuit board 130, 230. In such embodiments, pushing the connector 110, 210 into the port 122, 222 actuates the internal input member, which triggers the management system 180 to act (e.g., trigger the actuator 150, 250 to raise the stop member 140, 240).

Upon receiving an indication that the action has been taken (e.g., an LED lighting, flashing, changing color, etc.), the user may pull the connector 110, 210 out of the port 122, 222 at a remove operation 362. As noted above, the removal may be assisted by an ejector. The removal operation 550 performs any appropriate completion procedures and ends at a stop module 564.

Figure 29:
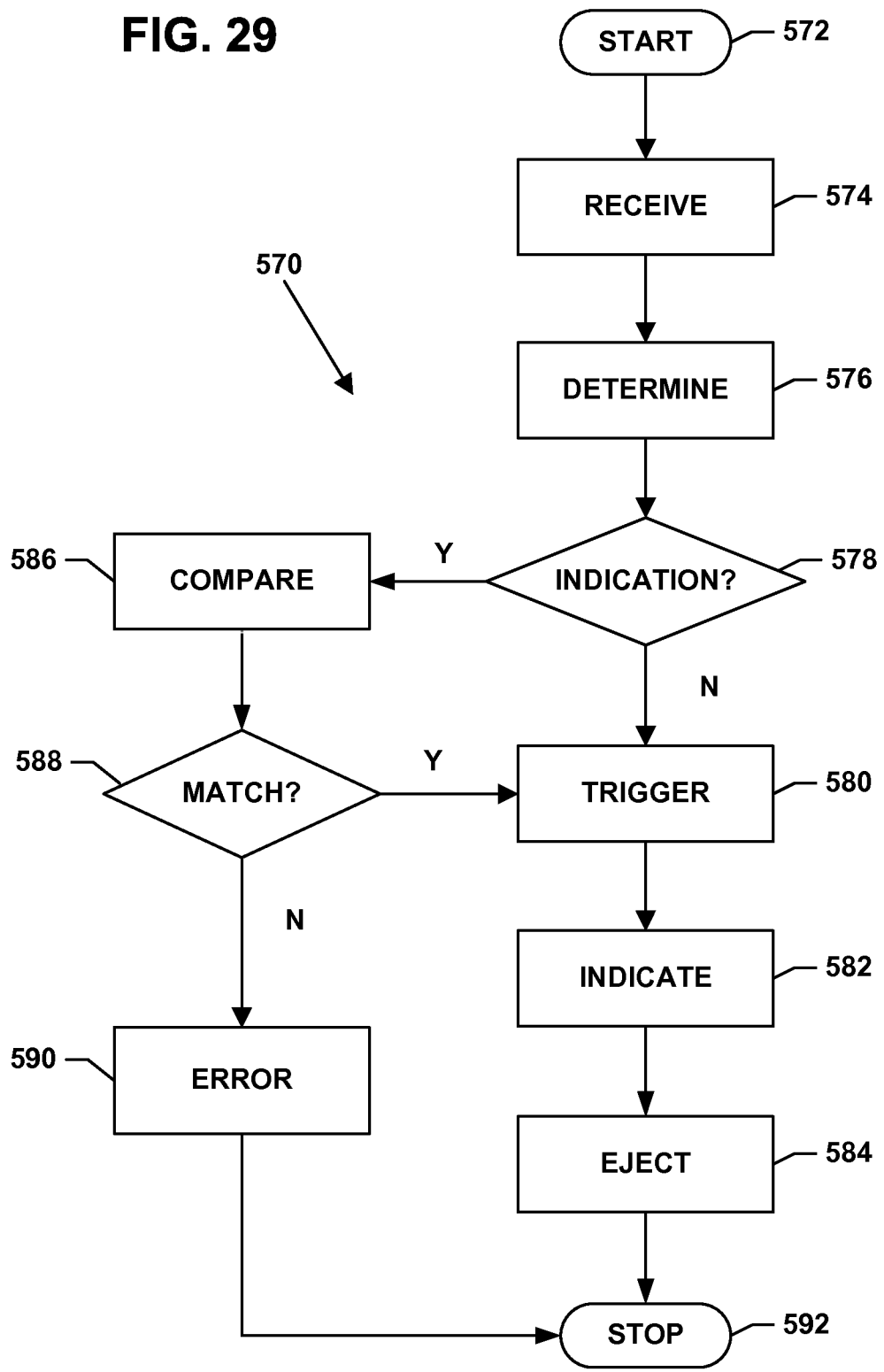
FIG. 29 is a flowchart illustrating a removal authorization process by which the management system may decide whether or not to unlatch a connector within an optical adapter.

FIG. 29 is a flowchart illustrating an operational flow for an authorization process 570 by which the management system 180 determines whether or not removal of a connector from an adapter port is appropriate. The process steps may be implemented by one or more processors associated with the management system 180. In certain implementations, the process steps are implemented locally at the adapter 120, 220 or adapter equipment. In other implementations, the process steps are implemented at a location remote from the adapters 120, 220. The removal authorization process 570 begins at a start module 572 and proceeds to a receive operation 574.

The receive operation 574 obtains a selection of a desired connector 120, 220 to be removed (i.e., or an adapter port 122, 222 from which a connector 120, 220 is desired to be removed). In some implementations, the receive operation 574 obtains a connector selection or port selection from a user via the user interface 186 of the management system 180 (FIG. 25). In certain implementations, the selection is obtained using a graphic interface. In certain implementations, the selection is obtained via a port identification number (or alphanumeric code) or connector identification number (or alphanumeric code). In certain implementations, the receiver operation 574 obtains multiple selections from the user.

After the desired connector 120, 220 or port 122, 222 has been selected, a determine operation 576 receives an indication from a user that the user is ready to disconnect the selected connector 120, 220 (i.e., to disconnect the connector 120, 220 plugged into the selected port 122, 222). For example, the determine operation 576 may receive and process a signal from a push button or other input member actuated manually by the user. In some implementations, the input member is located at the adapter 120, 220 or adapter equipment. In one example implementation, one input member is associated with all ports 122, 222 defined by the adapter equipment. In another implementation, each adapter port 122, 222 is associated with its own input member.

A first determination module 578 determines whether the readiness indication received in the determine operation 576 identifies a particular port 122, 222 from which a connector 120, 220 is to be removed (i.e., or a particular connector 300 to be removed). If the readiness indication does not identify a particular port 122, 222 or connector 120, 220, then the management system 180 implements a trigger operation 580 to cause the actuator 150, 150 associated with the port 122, 222 identified in the receive operation 572 to raise the stop member 140, 240 to release the connector 120, 220.

During an indicate operation 582, the management system 180 actuates an indicator to denote the connector 120, 220 being unlatched from the port 122, 222. In some implementations, the indicator visually denotes unlatching (e.g., lights an LED, flashes an LED, changes the color of an LED). In other implementations, the indicator audibly denotes unlatching. Optionally, the management system 180 may actuate an ejection member during an eject operation 584 to aid in removing the unlatched connector 120, 220 from the port 122, 222. For example, the management system 180 may release an ejector spring 358 to bias the connector 120, 220 out of the port 122, 222.

However, if the readiness indication of the determine operation 576 does identify a particular port 122, 222 or connector 120, 220, then the management system 180 implements a compare operation 586 that determines whether the user has identified the connector 120, 220 preselected for removal. If the readiness indication identifies the preselected connector 120, 220 or port 122, 222 (see the second determination module 588), then the management system 180 implements the trigger operation 580 and proceeds as described above.

If the readiness indication identifies a different connector 120, 220 or port 122, 222 at the second determination module 588, however, then the management system 180 implements an error operation 590. Similarly, if the second determination module 588 determines that no connector 120, 220 or port 122, 222 has been preselected, then the management system 180 will proceed to the error operation 590. The error operation 590 provides an indication to the user that the user is attempting an unauthorized removal of a connector. For example, the error operation 590 may generate or trigger a visual alarm (e.g., a flashing LED), an audible alarm, or some other type of alert. In certain implementations, the error operation 590 will identify (e.g., flash an LED located at) the connector 120, 220 preselected for removal.

The removal authorization operation 570 performs any appropriate completion procedures and ends at a stop module 592.

From the foregoing detailed description, it will be evident that modifications and variations can be made in the devices of the disclosure without departing from the spirit or scope of the invention. For example, the above latching techniques and management system can be applied to other types of optical connectors (e.g., MPO connectors, LX.5 connectors, etc.), to electrical connectors (e.g., RJ45 connectors, RJpoint5 connectors, USB connectors, etc.) and sockets, or to hybrid or mixed media connectors and adapters.

The above specification provides a complete description of the present invention. Since many embodiments of the invention can be made without departing from the spirit and scope of the invention, certain aspects of the invention reside in the claims hereinafter appended.

What is claimed is:

1. A connector system comprising:
a coupling assembly defining a port having an insertion axis, the coupling assembly including a lock member disposed within the port, the lock member being configured to move within the coupling assembly between a locking position and a releasing position, the lock member being configured to inhibit movement along the insertion axis of a plug connector received at the port when the lock member is disposed in the locking position, the lock member allowing movement of the plug connector along the insertion axis when the lock member is disposed in the releasing position;
an actuator coupled to the coupling assembly, the actuator being configured to move the stop member between the locking and releasing positions; and
a management system that controls the actuator, the management system including a reader, a presence sensing mechanism, and a user interface by which expected data for a plug connector is input, the expected data including expected physical layer information pertaining to the plug connector, the management system also including a processor coupled to the reader and to the presence sensing mechanism, the processor being configured to use the presence sensing mechanism to determine whether a plug connector has been inserted at the port, to use the reader to obtain data stored in memory on the plug connector, to determine whether the data obtained from the memory of the plug connector matches the expected data, and to trigger the actuator if the obtained data matches the expected data, wherein the obtained data includes obtained physical layer information pertaining to the plug connector.

2. The connector system of claim 1, wherein the actuator is configured to move the lock member mechanically.

3. The connector system of claim 1, wherein the actuator is configured to move the lock member electromagnetically.

4. The connector system of claim 1, wherein the actuator is configured to move the lock member electrostatically.

5. The connector system of claim 1, wherein the lock member is biased towards the locking position.

6. The connector system of claim 1, wherein the lock member is lowered and raised between the locking position and the releasing position.

7. The connector system of claim 1, wherein the lock member is pivoted between the locking position and the releasing position.

8. The connector system of claim 1, wherein the coupling assembly is one of a plurality of such coupling assemblies.

9. The connector system of claim 8, further comprising a circuit board coupled to the coupling assemblies, the circuit board being electrically coupled to the processor and to the actuator.

10. The connector system of claim 8, wherein the actuator is configured to move each of the stop members between the respective locking and releasing positions.

11. The connector system of claim 8, wherein the actuator is one of a plurality of actuators, each of the actuators being controlled by the management system.

12. The connector system of claim 1, wherein the lock member is configured to inhibit movement along the insertion axis of the plug connector received at the port by engaging a shoulder defined by the plug connector.

13. The connector system of claim 1, wherein the coupling assembly includes an optical adapter and the plug connector includes an optical plug connector.

14. The connector system of claim 13, wherein the optical adapter is configured to receive an LC-type plug connector at the port.

15. The connector system of claim 1, wherein the coupling assembly includes an electrical socket and the plug connector includes an electrical plug connector.

16. The connector system of claim 15, wherein the electrical socket is configured to receive an RJ45-type plug connector at the port.

17. The connector system of claim 1, further comprising a plug connector received at the port, the plug connector defining an externally accessible notch.

18. The connector system of claim 17, wherein the plug connector also includes a manually activated latching arm.

19. The connector system of claim 17, wherein the notch of the plug connector extends across a width of the plug connector.

20. The connector system of claim 17, wherein the notch of the plug connector cuts into a corner of the plug connector.

21. The connector system of claim 1, wherein the physical layer information includes a unique identification number associated with the plug connector.

* * * * *